US010061623B2

(12) United States Patent
Farrell et al.

(10) Patent No.: US 10,061,623 B2
(45) Date of Patent: *Aug. 28, 2018

(54) EXECUTION OF AN INSTRUCTION FOR PERFORMING A CONFIGURATION VIRTUAL TOPOLOGY CHANGE

(71) Applicant: International Business Machines Corporation, Armonk, NY (US)

(72) Inventors: Mark S Farrell, Pleasant Valley, NY (US); Charles W Gainey, Poughkeepsie, NY (US); Jeffrey P Kubala, Poughquag, NY (US); Donald W Schmidt, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/333,902

(22) Filed: Jul. 17, 2014

(65) Prior Publication Data

US 2014/0337602 A1 Nov. 13, 2014

Related U.S. Application Data

(63) Continuation of application No. 13/628,413, filed on Sep. 27, 2012, now Pat. No. 8,819,320.

(51) Int. Cl.
*G06F 9/50* (2006.01)
*G06F 15/76* (2006.01)
(Continued)

(52) U.S. Cl.
CPC ........ *G06F 9/5077* (2013.01); *G06F 9/30003* (2013.01); *G06F 9/44505* (2013.01); *G06F 15/76* (2013.01)

(58) Field of Classification Search
CPC .. G06F 9/30003; G06F 9/44505; G06F 9/455; G06F 9/5077; G06F 15/76;
(Continued)

(56) References Cited

U.S. PATENT DOCUMENTS 3,825,895 A * 7/1974 Larsen ................... G06F 7/026
340/146.2
3,982,229 A * 9/1976 Rouse ................ G06F 9/30018
712/300
(Continued)

FOREIGN PATENT DOCUMENTS

EP 0730226 A2 * 9/1996 ......... G06F 9/30145
EP 1674987 A2 * 6/2006 ........... G06F 9/5066
(Continued)

OTHER PUBLICATIONS z/Architecture Principles of Operation, International Business Machines Corporation, SA22-7832-05, 6th Edition, Apr. 2007.*
(Continued)

*Primary Examiner* — Thomas J Cleary
(74) *Attorney, Agent, or Firm* — Steven Chiu, Esq.; Blanche E. Schiller, Esq.; Heslin Rothenberg Farley & Mesiti P.C.

(57) ABSTRACT

In a logically partitioned host computer system comprising host processors (host CPUs) partitioned into a plurality of guest processors (guest CPUs) of a guest configuration, a perform topology function instruction is executed by a guest processor specifying a topology change of the guest configuration. The topology change preferably changes the polarization of guest CPUs, the polarization being related to the amount of a host CPU resource provided to a guest CPU.

20 Claims, 15 Drawing Sheets

(51) Int. Cl.
*G06F 9/445* (2006.01)
*G06F 9/30* (2006.01)

(58) Field of Classification Search
CPC .. G06F 15/78; G06F 15/7867; G06F 15/7871; G06F 15/80
See application file for complete search history.

(56) References Cited

U.S. PATENT DOCUMENTS

| | | | | |
|---|---|---|---|---|
| 4,569,016 A * | 2/1986 | Hao | ................... | G06F 9/30018 712/224 |
| 4,578,750 A * | 3/1986 | Amdahl | ................... | G06F 7/48 712/221 |
| 4,713,750 A * | 12/1987 | Damouny | ............. | G06F 7/5338 712/245 |
| 4,839,839 A * | 6/1989 | Tokumaru | ............... | G06F 5/015 708/209 |
| 5,113,523 A * | 5/1992 | Colley | .............. | G06F 15/17343 712/12 |
| 5,551,013 A * | 8/1996 | Beausoleil | .......... | G06F 17/5027 703/23 |
| 5,574,873 A * | 11/1996 | Davidian | ............ | G06F 9/45504 703/26 |
| 5,790,825 A * | 8/1998 | Traut | ................... | G06F 9/45504 703/26 |
| 5,859,994 A * | 1/1999 | Zaidi | ................... | G06F 9/30032 712/209 |
| 5,860,152 A * | 1/1999 | Savkar | ................... | G06F 9/324 711/213 |
| 5,870,598 A * | 2/1999 | White | ................. | G06F 9/30021 712/209 |
| 6,009,261 A * | 12/1999 | Scalzi | ................ | G06F 9/45504 703/26 |
| 6,067,613 A * | 5/2000 | Balmer | ............... | G06F 9/30032 708/500 |
| 6,112,293 A * | 8/2000 | Witt | ................... | G06F 9/30021 711/E12.043 |
| 6,223,256 B1* | 4/2001 | Gaither | ................. | G06F 12/126 711/118 |
| 6,308,255 B1* | 10/2001 | Gorishek, IV | ........ | G06F 9/3879 710/104 |
| 6,356,997 B1* | 3/2002 | Krishnan | ............ | G06F 9/30058 703/26 |
| 6,463,582 B1* | 10/2002 | Lethin | ................. | G06F 9/45504 717/138 |
| 6,763,327 B1* | 7/2004 | Songer | ................ | G06F 9/45504 703/20 |
| 7,200,736 B2* | 4/2007 | Klein | ................. | G06F 9/30134 712/205 |
| 7,337,442 B2* | 2/2008 | VoBa | ................... | G06F 9/5077 718/100 |
| 7,734,900 B2* | 6/2010 | Farrell | ................ | G06F 9/30003 712/225 |
| 7,739,434 B2* | 6/2010 | Farrell | ................ | G06F 9/30003 710/104 |
| 7,984,275 B2* | 7/2011 | Farrell | ................ | G06F 9/30003 712/225 |
| 8,015,335 B2* | 9/2011 | Farrell | ................ | G06F 9/30003 710/104 |
| 8,301,815 B2* | 10/2012 | Farrell | ................ | G06F 9/30003 710/104 |
| 8,819,320 B2* | 8/2014 | Farrell | ................ | G06F 9/30003 710/104 |
| 2003/0105833 A1* | 6/2003 | Daniels | ................... | H04L 29/06 709/219 |
| 2004/0015683 A1* | 1/2004 | Emma | ................... | G06F 9/3806 712/240 |
| 2004/0054996 A1* | 3/2004 | Srinivas | ................. | H04L 69/16 718/1 |
| 2006/0136653 A1* | 6/2006 | Traut | ................... | G06F 9/4406 711/6 |
| 2006/0149904 A1* | 7/2006 | Mowry | ................... | G06F 9/383 711/137 |
| 2007/0180008 A1* | 8/2007 | Klein | .................. | G06F 9/30032 708/209 |
| 2007/0203943 A1* | 8/2007 | Adlung | ............... | G06F 9/45558 |
| 2009/0183166 A1* | 7/2009 | Dillenberger | ......... | G06F 9/5077 718/104 |
| 2017/0308392 A1* | 10/2017 | Farrell | ................... | G06F 15/76 |

FOREIGN PATENT DOCUMENTS

| | | | | |
|---|---|---|---|---|
| EP | | 1734440 A2 * | 12/2006 | ......... G06F 9/30145 |
| WO | WO | 01023974 A3 * | 4/2001 | ............. G06F 9/455 |
| WO | WO | 2005022384 A1 * | 3/2005 | ........... G06F 8/4442 |

OTHER PUBLICATIONS

PDP11 Handbook, Digital Equipment Corporation, 1969.*
Patent Cooperation Treaty from the International Searching Authority, Date of mailing Mar. 25, 2009, International Application No. PCT/EP2009/050251, International filing date Jan. 12, 2009.*
European Patent Office PCT from the International Searching Authority, International Application No. PCT/ EP/2009/050250, International filing date Jan. 12, 2009, Applicant's reference POU080010, date of mailing Sep. 21, 2009.*
European Patent Office Communication extended European Search Report, Reference POU920080010EP2 Application No. 10184363. 9-2211, Applicant International Business Machines Corporation, Date: Jan. 28, 2011.*
MVS Update, vol. 196, z/Architecture Over.—part 2, Jan. 2003.*
Notice of Allowance for U.S. Appl. No. 11/972,766 dated Jan. 28, 2010, pp. 1-6.
Notice of Allowance for U.S. Appl. No. 11/972,802 dated Apr. 19, 2010, pp. 1-4.
Notice of Allowance for U.S. Appl. No. 12/636,200 dated Apr. 29, 2011, pp. 1-5.
Notice of Allowance for U.S. Appl. No. 12/779,232 dated Mar. 16, 2011, pp. 1-5.
Notice of Allowance for U.S. Appl. No. 13/160,536 dated Feb. 23, 2012, pp. 1-5.
Office Action for U.S. Appl. No. 11/972,766 dated Oct. 28, 2009, pp. 1-8.
Office Action for U.S. Appl. No. 12/636,200 dated Dec. 15, 2010, pp. 1-8.
Office Action for U.S. Appl. No. 12/779,232 dated Dec. 3, 2010, pp. 1-4.
Office Action for U.S. Appl. No. 13/160,536 dated Oct. 11, 2011, pp. 1-5.
Office Action for U.S. Appl. No. 13/193,641 dated Oct. 14, 2011, pp. 1-9.
Office Action for U.S. Appl. No. 13/628,413 dated Aug. 30, 2013, pp. 1-13.
Office Action for U.S. Appl. No. 15/645,792 dated Nov. 21, 2017, pp. 1-17.

* cited by examiner

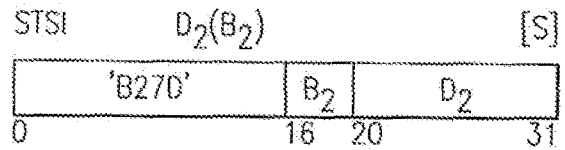
FIG.3
Prior Art
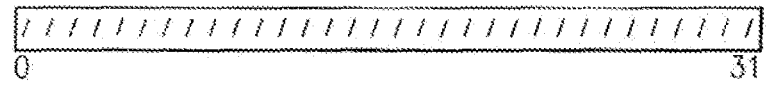
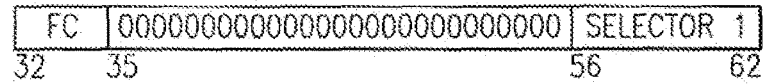
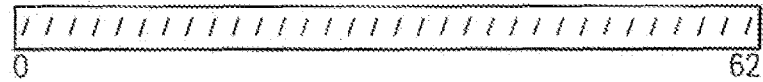
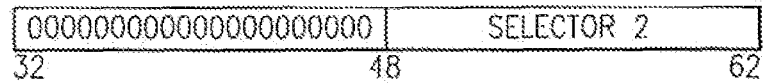
FIG.4
| FUNC CODE | SEL. 1 | SEL. 2 | REQUESTED INFORMATION |
|---|---|---|---|
| 0 | — | — | CURRENT CONFIGURATION-LEVEL NUMBER |
| 1 | 1 | 1 | BASIC-MACHINE CONFIGURATION |
| 1 | 2 | 1 | BASIC-MACHINE CPU |
| 1 | 2 | 2 | BASIC-MACHINE CPUs |
| 2 | 2 | 1 | LOGICAL-PARTITION CPU |
| 2 | 2 | 2 | LOGICAL-PARTITION CPUs |
| 3 | 2 | 2 | VIRTUAL-MACHINE CPUs |
| 15 | 1 | 2 | TOPOLOGY INFORMATION OF CURRENT CONFIGURATION |
FIG.5

FORMAT-0 SYSIB 1.2.2

| Offset | | | |
|---|---|---|---|
| 0 | FORMAT | RESERVED | |
| 1 | RESERVED | | |
| 7 | SECONDARY CPU CAPABILITY | | |
| 8 | CPU CAPABILITY | | |
| 9 | TOTAL CPU COUNT | CONFIGURED CPU COUNT | |
| 10 | STANDBY CPU COUNT | RESERVED CPU COUNT | |
| 11 – 1023 | MULTIPROCESSING CPU-CAPABILITY ADJUSTMENT FACTORS | | |

FORMAT-1 SYSIB 1.2.2

| Offset | | | |
|---|---|---|---|
| 0 | FORMAT | RESERVED | ACC OFFSET |
| 1 | RESERVED | | |
| 7 | SECONDARY CPU CAPABILITY | | |
| 8 | CPU CAPABILITY | | |
| 9 | TOTAL CPU COUNT | CONFIGURED CPU COUNT | |
| 10 | STANDBY CPU COUNT | RESERVED CPU COUNT | |
| 11 – N | MULTIPROCESSING CPU-CAPABILITY ADJUSTMENT FACTORS | | |
| N+1 | ALTERNATE CPU CAPABILITY | | |
| – 1023 | ALTERNATE MULTIPROCESSING CPU-CAPABILITY ADJUSTMENT FACTORS | | |

SYSIB 15.1.2

| | RESERVED | | LENGTH | |
|---|---|---|---|---|
| 0 | RESERVED | | LENGTH | |
| 1 | MAG6 | MAG5 | MAG4 | MAG3 |
| 2 | MAG2 | MAG1 | RESERVED | MHEST |
| 3 | RESERVED | | | |
| 4 ... N-1 | TOPOLOGY LIST | | | |
| N ... 1023 | RESERVED | | | |

TLE TYPE — CONTAINER

| | | | |
|---|---|---|---|
| 0 | NL NOT 0 | RESERVED | |
| 1 | 00000000 | RESERVED | CTNR ID |

TLE TYPE — CPU

| | | | |
|---|---|---|---|
| 0 | HL=0 | RESERVED | |
| 1 | 00000DPP | CPU TYPE | CPU ADDR ORIGIN |
| 2-3 | CPU MASK | | |

EXECUTION OF AN INSTRUCTION FOR PERFORMING A CONFIGURATION VIRTUAL TOPOLOGY CHANGE

CROSS-REFERENCE TO RELATED APPLICATIONS

This is a continuation of copending U.S. patent application Ser. No. 13/628,413, "EXECUTING AN INSTRUCTION FOR PERFORMING A CONFIGURATION VIRTUAL TOPOLOGY CHANGE", filed Sep. 27, 2012, which is a continuation of U.S. patent application Ser. No. 13/193,641, "EXECUTING AN INSTRUCTION FOR PERFORMING A CONFIGURATION VIRTUAL TOPOLOGY CHANGE", filed Jul. 29, 2011, now U.S. Pat. No. 8,301,815, issued Oct. 30, 2012, which is a continuation of U.S. patent application Ser. No. 12/636,200, "PERFORMING A CONFIGURATION VIRTUAL TOPOLOGY CHANGE AND INSTRUCTION THEREFORE", filed Dec. 11, 2009, now U.S. Pat. No. 8,015,335, issued Sep. 6, 2011, which is a continuation of U.S. patent application Ser. No. 11/972,766, "PERFORMING A CONFIGURATION VIRTUAL TOPOLOGY CHANGE AND INSTRUCTION THEREFORE", filed Jan. 11, 2008, now U.S. Pat. No. 7,739,434, issued Jun. 15, 2010. The disclosures of the foregoing applications and patents are incorporated herein by reference.

FIELD OF THE INVENTION

The present invention relates in general to virtualization of multi-processor systems. In particular, the present invention relates to enabling programs to change elements of the topology of their virtual environment.

BACKGROUND

Among the system control functions is the capability to partition the system into several logical partitions (LPARs). An LPAR is a subset of the system hardware that is defined to support an operating system. An LPAR contains resources (processors, memory, and input/output devices) and operates as an independent system. Multiple logical partitions can exist within a mainframe hardware system.

In the mainframe computer systems from IBM including the S/390®, for many years there was a limit of 15 LPARs. More recent machines have 30 (and potentially more). Such machines are exemplified by those of the z/Architecture®. The IBM® z/Architecture® is described in the z/Architecture Principles of Operation SA22-7832-05 published April, 2007 by IBM and is incorporated by reference herein in its entirety.

The IBM® z/Architecture® teaches elements of a computer system including PSWs, Condition Codes and General registers.

PSW:

The program-status word (PSW) includes the instruction address, condition code, and other information used to control instruction sequencing and to determine the state of the CPU. The active or controlling PSW is called the current PSW. It governs the program currently being executed. The CPU has an interruption capability, which permits the CPU to switch rapidly to another program in response to exceptional conditions and external stimuli. When an interruption occurs, the CPU places the current PSW in an assigned storage location, called the old-PSW location, for the particular class of interruption. The CPU fetches a new PSW from a second assigned storage location. This new PSW determines the next program to be executed. When it has finished processing the interruption, the program handling the interruption may reload the old PSW, making it again the current PSW, so that the interrupted program can continue. There are six classes of interruption: external, I/O, machine check, program, restart, and supervisor call. Each class has a distinct pair of old-PSW and new-PSW locations permanently assigned in real storage.

General Registers:

Instructions may designate information in one or more of 16 general registers. The general registers may be used as base-address registers and index registers in address arithmetic and as accumulators in general arithmetic and logical operations. Each register contains 64 bit positions. The general registers are identified by the numbers 0-15 and are designated by a four-bit R field in an instruction. Some instructions provide for addressing multiple general registers by having several R fields. For some instructions, the use of a specific general register is implied rather than explicitly designated by an R field of the instruction. For some operations, either bits 32-63 or bits 0-63 of two adjacent general registers are coupled, providing a 64-bit or 128-bit format, respectively. In these operations, the program must designate an even-numbered register, which contains the leftmost (high order) 32 or 64 bits. The next higher-numbered register contains the rightmost (low-order) 32 or 64 bits. In addition to their use as accumulators in general arithmetic and logical operations, 15 of the 16 general registers are also used as base-address and index registers in address generation. In these cases, the registers are designated by a four-bit B field or X field in an instruction. A value of zero in the B or X field specifies that no base or index is to be applied, and, thus, general register 0 cannot be designated as containing a base address or index.

The current program-status word (PSW) in the CPU contains information required for the execution of the currently active program. The PSW is 128 bits in length and includes the instruction address, condition code, and other control fields. In general, the PSW is used to control instruction sequencing and to hold and indicate much of the status of the CPU in relation to the program currently being executed. Additional control and status information is contained in control registers and permanently assigned storage locations. The status of the CPU can be changed by loading a new PSW or part of a PSW. Control is switched during an interruption of the CPU by storing the current PSW, so as to preserve the status of the CPU, and then loading a new PSW. Execution of LOAD PSW or LOAD PSW EXTENDED, or the successful conclusion of the initial-program-loading sequence, introduces a new PSW. The instruction address is updated by sequential instruction execution and replaced by successful branches. Other instructions are provided which operate on a portion of the PSW.

Program Status Word:

A new or modified PSW becomes active (that is, the information introduced into the current PSW assumes control over the CPU) when the interruption or the execution of an instruction that changes the PSW is completed. The interruption for PER associated with an instruction that changes the PSW occurs under control of the PER mask that is effective at the beginning of the operation.

Condition Code (CC):

Bits 18 and 19 are the two bits of the condition code. The condition code is set to 0, 1, 2, or 3, depending on the result obtained in executing certain instructions. Most arithmetic and logical operations, as well as some other operations, set the condition code. The instruction BRANCH ON CONDITION can specify any selection of the condition-code values as a criterion for branching.

Instruction Execution and Sequencing

According to the IBM z/Architecture, the program-status word (PSW), contains information required for proper program execution. The PSW is used to control instruction sequencing and to hold and indicate the status of the CPU in relation to the program currently being executed. The active or controlling PSW is called the current PSW.

Branch instructions perform the functions of decision making, loop control, and subroutine linkage. A branch instruction affects instruction sequencing by introducing a new instruction address into the current PSW. The relative-branch instructions with a 16-bit I2 field allow branching to a location at an offset of up to plus 64K–2 bytes or minus 64K bytes relative to the location of the branch instruction, without the use of a base register. The relative-branch instructions with a 32-bit I2 field allow branching to a location at an offset of up to plus 4G—2 bytes or minus 4G bytes relative to the location of the branch instruction, without the use of a base register.

Decision Making

Facilities for decision making are provided by the BRANCH ON CONDITION, BRANCH RELATIVE ON CONDITION, and BRANCH RELATIVE ON CONDITION LONG instructions. These instructions inspect a condition code that reflects the result of a majority of the arithmetic, logical, and I/O operations. The condition code, which consists of two bits, provides for four possible condition-code settings: 0, 1, 2, and 3.

The specific meaning of any setting depends on the operation that sets the condition code. For example, the condition code reflects such conditions as zero, nonzero, first operand high, equal, overflow, and subchannel busy. Once set, the condition code remains unchanged until modified by an instruction that causes a different condition code to be set.

Loop Control

Loop control can be performed by the use of BRANCH ON CONDITION, BRANCH RELATIVE ON CONDITION, and BRANCH RELATIVE ON CONDITION LONG to test the outcome of address arithmetic and counting operations. For some particularly frequent combinations of arithmetic and tests, BRANCH ON COUNT, BRANCH ON INDEX HIGH, and BRANCH ON INDEX LOW OR EQUAL are provided, and relative-branch equivalents of these instructions are also provided. These branches, being specialized, provide increased performance for these tasks.

Practical limitations of memory size, I/O availability, and available processing power usually limit the number of LPARs to less than these maximums.

The hardware and firmware that provides partitioning is known as PR/SM™ (Processor Resource/System Manager). It is the PR/SM functions that are used to create and run LPARs. This difference between PR/SM (a built-in facility) and LPARs (the result of using PR/SM) is often ignored and the term LPAR is used collectively for the facility and its results.

System administrators assign portions of memory to each LPAR and memory cannot be shared among LPARs. The administrators can assign processors (also known as central processors (CPs) or central processing units (CPUs)) to specific LPARs or they can allow the system controllers to dispatch any or all the processors to all the LPARs using an internal load-balancing algorithm. Channels (CHPIDs) can be assigned to specific LPARs or can be shared by multiple LPARs, depending on the nature of the devices on each channel.

A system with a single processor (CP processor) can have multiple LPARs. PR/SM has an internal dispatcher that can allocate a portion of the processor to each LPAR, much as an operating system dispatcher allocates a portion of its processor time to each process, thread, or task.

Partitioning control specifications are partly contained in the IOCDS and are partly contained in a system profile. The IOCDS and profile both reside in the Support Element (SE) which, for example, is simply a notebook computer inside the system. The SE can be connected to one or more Hardware Management Consoles (HMCs), which, for example, are desktop personal computers used to monitor and control hardware such as the mainframe microprocessors. An HMC is more convenient to use than an SE and can control several different mainframes.

Working from an HMC (or from an SE, in unusual circumstances), an operator prepares a mainframe for use by selecting and loading a profile and an IOCDS. These create LPARs and configure the channels with device numbers, LPAR assignments, multiple path information, and so forth. This is known as a Power-on Reset (POR). By loading a different profile and IOCDS, the operator can completely change the number and nature of LPARs and the appearance of the I/O configuration. However, doing this is usually disruptive to any running operating systems and applications and is therefore seldom done without advance planning.

Logical partitions (LPARs) are, in practice, equivalent to separate mainframes.

Each LPAR runs its own operating system. This can be any mainframe operating system; there is no need to run z/OS®, for example, in each LPAR. The installation planners may elect to share I/O devices across several LPARs, but this is a local decision.

The system administrator can assign one or more system processors for the exclusive use of an LPAR. Alternately, the administrator can allow all processors to be used on some or all LPARs. Here, the system control functions (often known as microcode or firmware) provide a dispatcher to share the processors among the selected LPARs. The administrator can specify a maximum number of concurrent processors executing in each LPAR. The administrator can also provide weightings for different LPARs; for example, specifying that LPAR1 should receive twice as much processor time as LPAR2.

The operating system in each LPAR is initialized (for example, IPLed) separately, has its own copy of its operating system, has its own operator console (if needed), and so forth. If the system in one LPAR crashes, there is no effect on the other LPARs.

In a mainframe system with three LPARs, for example, you might have a production z/OS in LPAR1, a test version of z/OS in LPAR2, and Linux® for S/390® in LPAR3. If this total system has 8 GB of memory, we might have assigned 4 GB to LPAR1, 1 GB to LPAR2, 1 GB to LPAR3, and have kept 2 GB in reserve. The operating system consoles for the two z/OS LPARs might be in completely different locations.

For most practical purposes there is no difference between, for example, three separate mainframes running z/OS (and sharing most of their I/O configuration) and three LPARs on the same mainframe doing the same thing. With minor exceptions z/OS, the operators, and applications cannot detect the difference.

The minor differences include the ability of z/OS (if permitted when the LPARs were defined or anytime during execution) to obtain performance and utilization information across the complete mainframe system and to dynamically shift resources (processors and channels) among LPARs to improve performance.

Today's IBM® mainframes, also called a central processor complex (CPC) or central electronic complex (CEC), may contain several different types of z/Architecture® processors that can be used for slightly different purposes.

Several of these purposes are related to software cost control, while others are more fundamental. All of the processors in the CPC begin as equivalent processor units (PUs) or engines that have not been characterized for use. Each processor is characterized by IBM during installation or at a later time. The potential characterizations are:

Processor (CP)

This processor type is available for normal operating system and application software.

System Assistance Processor (SAP)

Every modern mainframe has at least one SAP; larger systems may have several. The SAPs execute internal code to provide the I/O subsystem. A SAP, for example, translates device numbers and real addresses of channel path identifiers (CHPIDs), control unit addresses, and device numbers. It manages multiple paths to control units and performs error recovery for temporary errors. Operating systems and applications cannot detect SAPs, and SAPs do not use any "normal" memory.

Integrated Facility for Linux® (IFL)

This is a normal processor with one or two instructions disabled that are used only by z/OS®. Linux does not use these instructions and can therefore operate on an IFL. Linux can be executed by a CP as well. The difference is that an IFL is not counted when specifying the model number of the system. This can make a substantial difference in software costs.

zAAP

This is a processor with a number of functions disabled (interrupt handling, some instructions) such that no full operating system can operate on the processor. However, z/OS can detect the presence of zAAP processors and will use them to execute Java™ code. The same Java code can be executed on a standard CP. Again, zAAP engines are not counted when specifying the model number of the system. Like IFLs, they exist only to control software costs.

zIIP

The System z9™ Integrated Information Processor (zIIP) is a specialized engine for processing eligible database workloads. The zIIP is designed to help lower software costs for select workloads on the mainframe, such as business intelligence (BI), enterprise resource planning (ERP) and customer relationship management (CRM). The zIIP reinforces the mainframe's role as the data hub of the enterprise by helping to make direct access to DB2® more cost effective and reducing the need for multiple copies of the data.

Integrated Coupling Facility (ICF)

These processors run only Licensed Internal Code. They are not visible to normal operating systems or applications. For example, a coupling facility is, in effect, a large memory scratch pad used by multiple systems to coordinate work. ICFs must be assigned to LPARs that then become coupling facilities.

Spare

An uncharacterized PU functions as a "spare." If the system controllers detect a failing CP or SAP, it can be replaced with a spare PU. In most cases this can be done without any system interruption, even for the application running on the failing processor.

In addition to these characterizations of processors, some mainframes have models or versions that are configured to operate slower than the potential speed of their CPs. This is widely known as "knee-capping", although IBM prefers the term capacity setting, or something similar. It is done, for example, by using microcode to insert null cycles into the processor instruction stream. The purpose, again, is to control software costs by having the minimum mainframe model or version that meets the application requirements. IFLs, SAPs, zAAPs, zIIPs, and ICFs always function at the full speed of the processor because these processors "do not count" in software pricing calculations.

Processor and CPU can refer to either the complete system box, or to one of the processors (CPUs) within the system box. Although the meaning may be clear from the context of a discussion, even mainframe professionals must clarify which processor or CPU meaning they are using in a discussion. IBM uses the term central processor complex (CPC) to refer to the physical collection of hardware that includes main storage, one or more central processors, timers, and channels. (Some system programmers use the term central electronic complex (CEC) to refer to the mainframe "box," but the preferred term is CPC.)

Briefly, all the S/390 or z/Architecture processors within a CPC are processing units (PUs). When IBM delivers the CPC, the PUs are characterized as CPs (for normal work), Integrated Facility for Linux (IFL), Integrated Coupling Facility (ICF) for Parallel Sysplex configurations, and so forth.

Mainframe professionals typically use system to indicate the hardware box, a complete hardware environment (with I/O devices), or an operating environment (with software), depending on the context. They typically use processor to mean a single processor (CP) within the CPC.

The z/VM® HYPERVISOR™ is designed to help clients extend the business value of mainframe technology across the enterprise by integrating applications and data while providing exceptional levels of availability, security, and operational ease. z/VM virtualization technology is designed to allow the capability for clients to run hundreds to thousands of Linux servers on a single mainframe running with other System z operating systems, such as z/OS®, or as a large-scale Linux-only enterprise server solution. z/VM V5.3 can also help to improve productivity by hosting non-Linux workloads such as z/OS, z/VSE, and z/TPF.

z/VM provides each user with an individual working environment known as a virtual machine. The virtual machine simulates the existence of a dedicated real machine, including processor functions, memory, networking, and input/output (I/O) resources. Operating systems and application programs can run in virtual machines as guests. For example, you can run multiple Linux and z/OS images on the same z/VM system that is also supporting various applications and end users. As a result, development, testing, and production environments can share a single physical computer.

Referring to FIGS. 15A-15D, partitioning and virtualization involve a shift in thinking from physical to logical by treating system resources as logical pools rather than as separate physical entities. This involves consolidating and pooling system resources, and providing a "single system illusion" for both homogeneous and heterogeneous servers, storage, distributed systems, and networks.

Partitioning of hardware involves separate CPUs for separate operating systems, each of which runs its specific applications. Software partitioning employs a software-based "hypervisor" to enable individual operating systems to run on any or all of the CPUs.

Hypervisors allow multiple operating systems to run on a host computer at the same time. Hypervisor technology originated in the IBM VM/370, the predecessor of the z/VM we have today. Logical partitioning (LPAR) involves partitioning firmware (a hardware-based hypervisor, for example, PR/SM) to isolate the operating system from the CPUs.

Virtualization enables or exploits four fundamental capabilities: resource sharing, resource aggregation, emulation of function, and insulation. We explore these topics in more detail in the following sections.

z/VM is an operating system for the IBM System z platform that provides a highly flexible test and production environment. The z/VM implementation of IBM virtualization technology provides the capability to run full-function operating systems such as Linux on System z, z/OS, and others as "guests" of z/VM. z/VM supports 64-bit IBM z/Architecture guests and 31-bit IBM Enterprise Systems Architecture/390 guests.

z/VM provides each user with an individual working environment known as a virtual machine. The virtual machine simulates the existence of a dedicated real machine, including processor functions, memory, networking, and input/output (I/O) resources. Operating systems and application programs can run in virtual machines as guests. For example, you can run multiple Linux and z/OS® images on the same z/VM system that is also supporting various applications and end users. As a result, development, testing, and production environments can share a single physical computer.

A virtual machine uses real hardware resources, but even with dedicated devices (like a tape drive), the virtual address of the tape drive may or may not be the same as the real address of the tape drive. Therefore, a virtual machine only knows "virtual hardware" that may or may not exist in the real world.

For example, in a basic-mode system, a first-level z/VM is the base operating system that is installed on top of the real hardware FIG. 15D. A second-level operating system is a system that is created upon the base z/VM operating system. Therefore, z/VM as a base operating system runs on the hardware, while a guest operating system runs on the virtualization technology. FIG. 15D, illustrates a second level guest z/VM OS loaded into a first level guest (guest-1) partition.

In other words, there is a first-level z/VM operating system that sits directly on the hardware, but the guests of this first-level z/VM system are virtualized. By virtualizing the hardware from the guests, we are able to create and use as many guests as needed with a small amount of hardware.

As previously mentioned, operating systems running in virtual machines are often called "guests". Other terms and phrases you might encounter are:

"Running first level" or "running natively" means running directly on the hardware (which is what z/VM does).
"Running second level", "running under VM", or "running on (top of) VM", or "running as a guest-1" means running as a guest. Using the z/VM operating system, it is also possible to "run as a guest-2" when z/VM itself runs as a guest-1 on a PR/SM hypervisor.

An example of the functionality of z/VM is, if you have a first-level z/VM system and a second-level z/VM system, you could continue to create more operating systems on the second-level system. This type of environment is particularly useful for testing operating system installation before deployment, or for testing or debugging operating systems.

Virtual resources can have functions or features that are not available in their underlying physical resources. FIG. 2 illustrates virtualization by resource emulation. Such functions or features are said to be emulated by the host program such that the guest observes the function or feature to be provided by the system when it is actually provided due to the host-program assistance.

Examples include architecture emulation software that implements one processor's architecture using another; iSCSI, which implements a virtual SCSI bus on an IP network; and virtual-tape storage implemented on physical disk storage.

Furthermore, the packing of central-processing units (CPUs) in modern technology is often hierarchical. Multiple cores can be placed on a single chip. Multiple chips can be placed in a single module. Multiple modules can be packaged on a board often referred to as a book, and multiple books can be distributed across multiple frames.

CPUs often have several levels of caches, for example each processor may have a cache (or possibly a split Instruction cache and a data cache) and there may be additional larger caches between each processor and the main memory interface. Depending upon the level of the hierarchy, caches are also placed in order to improve overall performance, and at certain levels, a cache may be shared among more than a single CPU. The engineering decisions regarding such placement deal with space, power/thermal, cabling distances, CPU frequency, memory speed, system performance, and other aspects. This placement of elements of the CPU creates an internal structure that can be more or less favorable to a particular logical partition, depending upon where the placement of each CPU of the partition resides. A logical partition gives the appearance to an operating system, of ownership of certain resources including processor utilization where in actuality, the operating system is sharing the resources with other operating systems in other partitions. Normally, software is not aware of the placement and, in a symmetric-multiprocessing (SMP) configuration, observes a set of CPUs where each CPU provides the same level of performance. The problem is that ignorance of the internal packaging and "distance" between any two CPUs can result in software making less than optimum choices on how CPUs can be assigned work. Therefore, the full potential of the SMP configuration is not achieved.

The mainframe example of virtualization presented is intended to teach various topologies possible in virtualizing a machine. As mentioned, the programs running in a partition (including the operating systems) likely have a view that the resources available to them, including the processors, memory and I/O are dedicated to the partition. In fact, programs do not have any idea that they are running in a partition. Such programs are also not aware of the topology of their partition and therefore cannot make choices based on such topology. What is needed is a way for programs to optimize for the configuration topology on which they are running.

SUMMARY

The shortcomings of the prior art are overcome, and additional advantages are provided, through the provision of a method, system, and computer program product for enabling a subset of dormant computer hardware resources in an upgradeable computer system having a set of dormant computer hardware resources.

A host computer comprising host CPUs can be partitioned into logical/virtual partitions having guest CPUs. The partitioning is preferably accomplished by firmware or by software as might be provided by an operating system such as z/VM from IBM. Each guest CPU is a virtual CPU in that the guest programs view the guest CPUs as actual CPU processors, but in fact, the underlying host is mapping each guest CPU to host CPU resources. In an embodiment, a guest CPU is implemented using a portion of a host CPU by the host designating a portion of CPU time for the guest CPU to utilize the host CPU. It is envisioned that a plurality of guest CPUs might be supported by a single host CPU but the opposite may also apply.

In another embodiment, the guest CPUs are emulated by software whereby, emulation routines convert functions of the guest CPU (including instruction decode and execution) to routines that run on host CPUs. The host CPUs are provisioned to support guest CPUs.

In another embodiment, a first guest image may be the host of a second guest image. In which case the second guest CPUs are provisioned by first guest CPUs which are themselves provisioned by host CPUs. The topology of the configurations is a nesting of levels of guest CPUs and one or more host CPUs.

A new PERFORM TOPOLOGY FACILITY (PTF) instruction is provided and the prior art STORE SYSTEM INFORMATION (STSI) instruction is enhanced to provide a new SYSIB (SYSIB identifier 15.1.2) which provides component affinity and logical packaging information to software. This permits the software to apply informed and intelligent selection on how individual elements, such as processing units of the multi-processor, are assigned to various applications and workloads. Thus providing information to a program (OS) for improving performance by increasing the shared-cache hit ratios for example.

A new PERFORM TOPOLOGY FUNCTION (PTF) instruction is used by a privileged program (such as a supervisor, an OS, a kernel and the like) to request that the CPU configuration topology within which the program is running be changed. In an embodiment, the guest CPU topology is switched between horizontal and vertical polarization.

By having the capability to learn the CPU topology information, the program understands the "distance" between any arbitrary two or more CPUs of a symmetric-multiprocessing configuration.

The capability provided for minimizing the aggregate distance of all CPUs in a configuration, and how particular application-program tasks are dispatched on the individual CPUs provides supervisory programs with the ability to improve performance. The improved performance can result from one or more of the following attributes which are improved by better topology knowledge:

Shortening Inter-CPU Signaling Paths.

Shared storage, accessed by multiple CPUs is more likely to be in caches that are closer to the set of CPUs. Therefore, inter-cache storage use is confined to a smaller subset of the overall machine and configuration which allows faster cache-to-cache transfer. Presence of a storage location in the closest cache of a CPU (L1) is significantly more likely to occur.

Because of improved performance, the number of CPUs actually in the configuration can be fewer in number, while still getting the same job done in the same or less run time. Such reduction of CPUs lessens the number of communication paths that each CPU must use to communicate with the other CPUs of the configuration, thereby further contributing to overall performance improvement.

For example, if 10 CPUs need to execute a particular program, the inter-cache traffic is substantial whereas if the same program can be executed on one CPU, there is no inter-cache traffic. This indicates that the cache presence of desired storage locations is guaranteed to be in the cache of the single CPU, if that storage is in any cache at all.

When storage and associated cache hierarchy is local, as opposed to being distributed across multiple physical frames (i.e. boxes, etc.), signaling paths are shorter. Topology knowledge indicates the relative distance in selecting the appropriate subset of CPUs to assign to an application program such that, even within a larger set of CPUs in an SMP configuration, the subset optimizes the minimized distance among them. This is sometimes called an affinity group The notions of CPU-count reduction and distance between CPUs are informed by topology information which allows the program to optimize the assignment of CPUs to an affinity group.

An object of the present invention is to provide in a logically partitioned host computer system comprising host processors (host CPUs), a method, system, and program product for a configuration change of a topology of a plurality of guest processors (guest CPUs) of a guest configuration. Preferably, a guest processor of the guest configuration fetches a PERFORM TOPOLOGY FUNCTION instruction defined for a computer architecture, the PERFORM TOPOLOGY FUNCTION INSTRUCTION comprising an opcode field specifying a function to be performed. The function to be performed by execution of the perform topology function instruction comprising: requesting a specified change of the configuration of the polarization of the guest processors of the guest configuration; and responsive to the requested specified polarization change, changing the configuration of the topology of the guest processors of the guest configuration according to the specified polarization change.

In an aspect of the invention the PERFORM TOPOLOGY FUNCTION instruction further comprises a register field, wherein the executing the PERFORM TOPOLOGY FUNCTION instruction further comprises: obtaining from a function code field of a register specified by the register field, a function code field value, the function code field value consisting of any one of a horizontal polarization instruction specifier, a vertical polarization instruction specifier or a check of the status of a topology change specifier; responsive to the instruction specifying the horizontal polarization, initiating horizontal polarization of the guest processors of the computer configuration; responsive to the instruction specifying the vertical polarization, initiating vertical polarization of the guest processors of the computer configuration; and setting a result code value in a result field of the register.

In another aspect of the invention, initiated polarization is asynchronous to the completion of the execution, and responsive to the function code field value specifying a status check of a topology change the completion status of the topology change is checked.

In an embodiment, horizontal polarization comprises providing substantially equal host processor resource to each guest processor resource, wherein vertical polarization comprises providing substantially more host processor resource to at least one guest processor of said guest processors than to at least another guest processor of said guest processors.

In another embodiment, the result code value specifies a reason code indicating an inability to accept the polarization request and consisting of: responsive to the configuration being polarized as specified by the function code prior to execution, the result code value indicating the configuration is already polarized according to the function code; and responsive to the configuration processing an incomplete polarization prior to execution, the result code value indicating a topology change is already in process.

In an embodiment, the execution further comprises: responsive to a topology change being in progress, setting a condition code indicating a topology-change initiated; and responsive to the request being rejected, setting a condition code indicating the request is rejected.

In an embodiment, the execution further comprises: responsive to no topology change report being pending, setting a condition code indicating a topology-change-report not pending; and responsive to a topology change report being pending, setting a condition code indicating a topology-change-report pending.

In an embodiment, the perform topology function instruction defined for the computer architecture is fetched and executed by a central processing unit of an alternate computer architecture, wherein the method further comprises interpreting the PERFORM TOPOLOGY FUNCTION instruction to identify a predetermined software routine for emulating the operation of the PERFORM TOPOLOGY FUNCTION instruction; and wherein executing the PERFORM TOPOLOGY FUNCTION instruction comprises executing the predetermined software routine to perform steps of the method for executing the machine instruction.

Additional features and advantages are realized through the techniques of the present invention. Other embodiments and aspects of the invention are described in detail herein and are considered a part of the claimed invention. For a better understanding of the invention with advantages and features, refer to the description and the drawings.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 3 depicts an instruction format of a prior art STSI machine instruction;

FIG. 4 depicts implied registers of the prior art STSI instruction;

FIG. 5 depicts a function code table;

FIG. 8 depicts a prior art Format-1 SYSIB 1.2.2 table;

FIG. 9 depicts a prior art Format-2 SYSIB 1.2.2 table;

FIG. 10 depicts a SYSIB 15.1.2 table according to the invention;

FIG. 11 depicts a container type TLE;

FIG. 12 depicts a CPU type TLE;

DETAILED DESCRIPTION

Figure 1:
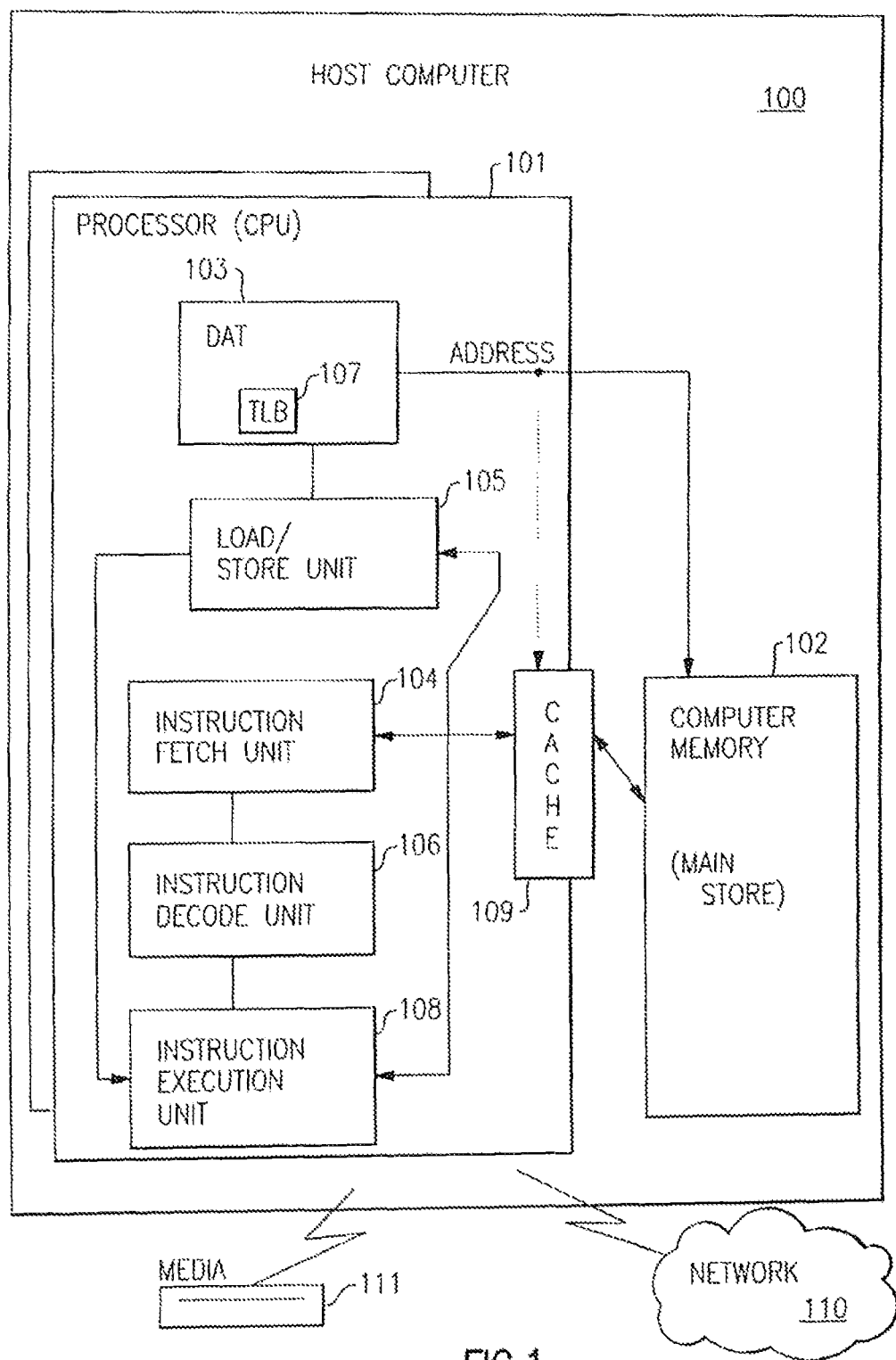
FIG. 1 depicts a Host Computer system of the prior art.

In a mainframe, architected machine instructions are used by programmers (typically writing applications in "C" but also Java®, COBOL, PL/I, PL/X, Fortran and other high level languages), often by way of a compiler application. These instructions stored in the storage medium may be executed natively in a z/Architecture IBM Server, or alternatively in machines executing other architectures. They can be emulated in the existing and in future IBM mainframe servers and on other machines of IBM (e.g. pSeries® Servers and xSeries® Servers). They can be executed in machines running Linux on a wide variety of machines using hardware manufactured by IBM®, Intel®, AMD™, Sun Microsystems and others. Besides execution on that hardware under a z/Architecture®, Linux can be used as well as machines which use emulation by Hercules, UMX, FSI (Fundamental Software, Inc.) or Platform Solutions, Inc. (PSI), where generally execution is in an emulation mode. In emulation mode, emulation software is executed by a native processor to emulate the architecture of an emulated processor.

The native processor typically executes emulation software comprising either firmware or a native operating system to perform emulation of the emulated processor. The emulation software is responsible for fetching and executing instructions of the emulated processor architecture. The emulation software maintains an emulated program counter to keep track of instruction boundaries. The emulation software may fetch one or more emulated machine instructions at a time and convert the one or more emulated machine instructions to a corresponding group of native machine instructions for execution by the native processor. These converted instructions may be cached such that a faster conversion can be accomplished. Notwithstanding, the emulation software must maintain the architecture rules of the emulated processor architecture so as to assure operating systems and applications written for the emulated processor operate correctly. Furthermore the emulation software must provide resources identified by the emulated processor architecture including, but not limited to control registers, general purpose registers (often including floating point registers), dynamic address translation function including segment tables and page tables for example, interrupt mechanisms, context switch mechanisms, Time of Day (TOD) clocks and architected interfaces to I/O subsystems such that an operating system or an application program designed to run on the emulated processor, can be run on the native processor having the emulation software.

A specific instruction being emulated is decoded, and a subroutine called to perform the function of the individual instruction. An emulation software function emulating a function of an emulated processor is implemented, for example, in a "C" subroutine or driver, or some other method of providing a driver for the specific hardware as will be within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6,308,255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al; and U.S. Pat. No. 5,790,825: Method for emulating guest instructions on a host computer through dynamic recompilation of host instructions of Eric Traut; and many others, illustrate the a variety of known ways to achieve emulation of an instruction format architected for a different machine for a target machine available to those skilled in the art, as well as those commercial software techniques used by those referenced above.

Referring to FIG. 1, representative components of a host computer system 100 are portrayed. Other arrangements of components may also be employed in a computer system which are well known in the art.

The host computing environment is preferably based on the z/Architecture offered by International Business Machines Corporation (IBM®), Armonk, N.Y. The z/Architecture is more fully described in: z/Architecture Principles of Operation, IBM Pub. No. SA22-7832-05, $6^{th}$ Edition, (April 2007), which is hereby incorporated by reference herein in its entirety. Computing environments based on the z/Architecture include, for example, eServer™ and zSeries®, both by IBM®.

The representative host computer 100 comprises one or more CPUs 101 in communication with main store (computer memory 102) as well as I/O interfaces to storage devices 111 and networks 101 for communicating with other computers or SANs and the like. The CPU may have Dynamic Address Translation (DAT) 103 for transforming program addresses (virtual addresses) into real address of memory. A DAT typically includes a Translation Lookaside Buffer (TLB) 107 for caching translations so that later accesses to the block of computer memory 102 do not require the delay of address translation. Typically a cache 109 is employed between computer memory 102 and the Processor 101. The cache 109 may be hierarchical having a large cache available to more than one CPU and smaller, faster (lower level) caches between the large cache and each CPU. In some implementations the lower level caches are split to provide separate low level caches for instruction fetching and data accesses. In an embodiment, an instruction is fetched from memory 102 by an instruction fetch unit 104 via a cache 109. The instruction is decoded in an instruction decode unit (16) and dispatched (with other instructions in some embodiments) to instruction execution units 108. Typically several execution units 108 are employed, for example an arithmetic execution unit, a floating point execution unit and a branch instruction execution unit. The instruction is executed by the execution unit, accessing operands from instruction specified registers or memory as needed. If an operand is to be accessed (loaded or stored) from memory 102, a load store unit 105 typically handles the access under control of the instruction being executed.

In an embodiment, the invention may be practiced by software (sometimes referred to Licensed Internal Code (LIC), firmware, microcode, millicode, picocode and the like, any of which would be consistent with the present invention). Software program code which embodies the present invention is typically accessed by the processor also known as a CPU (Central Processing Unit) 101 of computer system 100 from long term storage media 111, such as a CD-ROM drive, tape drive or hard drive. The software program code may be embodied on any of a variety of known media for use with a data processing system, such as a diskette, hard drive, or CD-ROM. The code may be distributed on such media, or may be distributed to users from the computer memory 102 or storage of one computer system over a network 110 to other computer systems for use by users of such other systems.

Alternatively, the program code may be embodied in the memory 102, and accessed by the processor 101 using the processor bus. Such program code includes an operating system which controls the function and interaction of the various computer components and one or more application programs. Program code is normally paged from dense storage media 111 to high speed memory 102 where it is available for processing by the processor 101. The techniques and methods for embodying software program code in memory, on physical media, and/or distributing software code via networks are well known and will not be further discussed herein. Program code, when created and stored on a tangible medium (including but not limited to electronic memory modules (RAM), flash memory, compact discs (CDs), DVDs, magnetic tape and the like is often referred to as a "computer program product". The computer program product medium is typically readable by a processing circuit preferably in a computer system for execution by the processing circuit.

Figure 2:
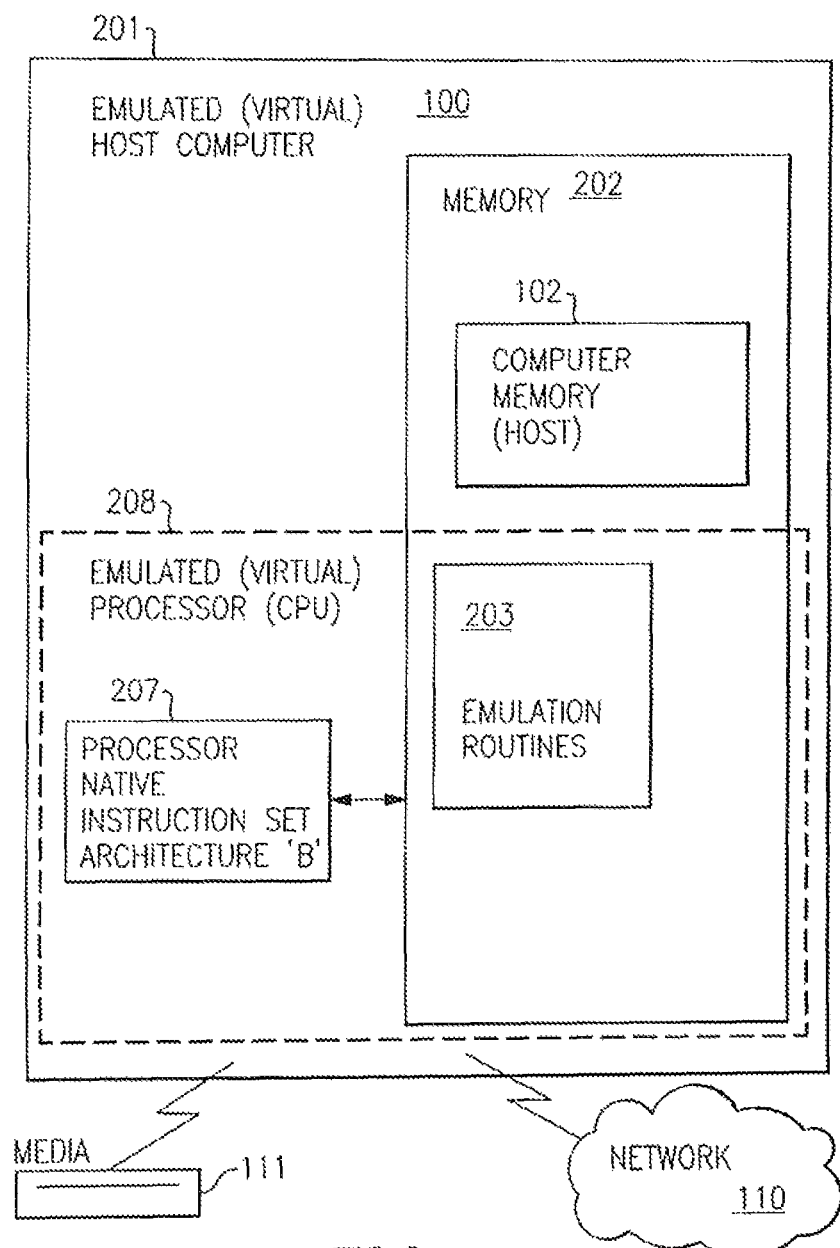
FIG. 2 depicts a prior art emulated Host Computer system.

In FIG. 2, an example emulated host computer system 201 is provided that emulates a host computer system 100 of a host architecture. In the emulated host computer system 201, the host processor (CPUs) 208 is an emulated host processor (or virtual host processor) and comprises an emulation processor 207 having a different native instruction set architecture than that of used by the processor 101 of the host computer 100. The emulated host computer system 201 has memory 202 accessible to the emulation processor 207. In the example embodiment, the memory 202 is partitioned into a host computer memory 102 portion and an emulation routines 203 portion. The host computer memory 102 is available to programs of the emulated host computer 201 according to host computer architecture. The emulation processor 207 executes native instructions of an architected instruction set of an architecture other than that of the emulated processor 208, the native instructions obtained from emulation routines memory 203, and may access a host instruction for execution from a program in host computer memory 102 by employing one or more instruction(s) obtained in a Sequence & Access/Decode routine which may decode the host instruction(s) accessed to determine a native instruction execution routine for emulating the function of the host instruction accessed.

Other facilities that are defined for the host computer system 100 architecture may be emulated by Architected Facilities Routines, including such facilities as General Purpose Registers, Control Registers, Dynamic Address Translation, and I/O Subsystem support and processor cache for example. The emulation routines may also take advantage of function available in the emulation processor 207 (such as General Registers and dynamic translation of virtual addresses) to improve performance of the emulation routines. Special hardware and Off Load Engines may also be provided to assist the processor 207 in emulating the function of the host computer 100.

U.S. patent application Ser. No. 11/972,734 "ALGORITHM TO SHARE PHYSICAL PROCESSORS TO MAXIMIZE PROCESSOR CACHE USAGE AND TOPOLOGIES" filed on the same day as application Ser. No. 11/972,766, describes creation of topology information and is incorporated herein in its entirety by reference.

In order to provide topology information to programs, two instructions are provided. The first is an enhancement to a prior art instruction STSI (Store System Information) and the second is a new instruction PTF (Perform Topology Function).

CPU Topology Overview:

With the advent of the new IBM eSeries mainframes, and even previously, machine organization into nodal structures has resulted in a non-uniform memory access (NUMA) behavior (sometimes also called "lumpiness"). The purpose of the new SYSIB 15.1.2 function of the prior art STSI (Store System Information) instruction and the new PERFORM TOPOLOGY FUNCTION (PTF) instruction is to provide additional machine topology awareness to the program so that certain optimizations can be performed (including improved cache-hit ratios) and thereby improve overall performance. The amount of host-CPU resource assigned to a multiprocessing (MP) guest configuration has generally been spread evenly across the number of configured guest CPUs. (A guest CPU is a logical CPU provided to a program, all guest CPUs are supported by software/hardware partitioning on actual host CPUs). Such an even spread implies that no particular guest CPU (or CPUs) are entitled to any extra host-CPU provisioning than any other arbitrarily determined guest CPUs. This condition of the guest configuration, affecting all CPUs of the configuration, is called "horizontal polarization". Under horizontal polarization, assignment of a host CPU to a guest CPU is approximately the same amount of provisioning for each guest CPU. When the provisioning is not dedicated, the same host CPUs provisioning the guest CPUs also may be used to provision guest CPUs of another guest, or even other guest CPUs of the same guest configuration.

When the other guest configuration is a different logical partition, a host CPU, when active in each partition, typically must access main storage more because the cache-hit ratio is reduced by having to share the caches across multiple relocation zones. If host-CPU provisioning can alter the balance such that some host CPUs are mostly, or even exclusively, assigned to a given guest configuration (and that becomes the normal behavior), then cache-hit ratios improve, as does performance. Such an uneven spread implies that one or more guest CPUs are entitled to extra host-CPU provisioning versus other, arbitrarily determined guest CPUs that are entitled to less host-CPU provisioning. This condition of the guest configuration, affecting all CPUs of the configuration, is called "vertical polarization". The architecture presented herein categorizes vertical polarization into three levels of entitlement of provisioning, high, medium, and low:

High entitlement guarantees approximately 100% of a host CPU being assigned to a logical/virtual CPU, and the affinity is maintained as a strong correspondence between the two. With respect to provisioning of a logical partition, when vertical polarization is in effect, the entitlement of a dedicated CPU is defined to be high.

Medium entitlement guarantees an unspecified amount of host CPU resource (one or more host CPUs) being assigned to a logical/virtual CPU, and any remaining capacity of the host CPU is considered to be slack that may be assigned elsewhere. The best case for the available slack would be to assign it as local slack if that is possible. A less-beneficial result occurs if that available slack is assigned as remote slack. It is also the case that the resource percentage assigned to a logical CPU of medium entitlement is a much softer approximation as compared to the 100% approximation of a high-entitlement setting.

Low entitlement guarantees approximately 0% of a host CPU being assigned to a logical/virtual CPU. However, if slack is available, such a logical/virtual CPU may still receive some CPU resource. A model of nested containers using polarization is intended to provide a level of intelligence about the machine's nodal structure as it applies to the requesting configuration, so that, generally, clusters of host CPUs can be assigned to clusters of guest CPUs, thereby improving as much as possible the sharing of storage and the minimizing of different configurations essentially colliding on the same host CPUs. Polarization and entitlement indicate the relationship of physical CPUs to logical CPUs or logical CPUs to virtual CPUs in a guest configuration, and how the capacity assigned to the guest configuration is apportioned across the CPUs that comprise the configuration.

Historically, a guest configuration has been horizontally polarized. For however many guest CPUs were defined to the configuration, the host-CPU resource assigned was spread evenly across all of the guest CPUs in an equitable, non-entitled manner. It can be said that the weight of a single logical CPU in a logical partition when horizontal polarization is in effect is approximately equal to the total configuration weight divided by the number of CPUs. However, with the introduction of the 2097 and family models, it becomes imperative to be able to spread the host-CPU resource in a different manner, which is called vertical polarization of a configuration, and then the degree of provisioning of guest CPUs with host CPUs being indicated as high, medium, or low entitlement. High entitlement is in effect when a logical/virtual CPU of a vertically-polarized configuration is entirely backed by the same host CPU. Medium entitlement is in effect when a logical/virtual CPU of a vertically-polarized configuration is partially backed by a host CPU. Low entitlement is in effect when a logical/virtual CPU of a vertically-polarized configuration is not guaranteed any host-CPU resource, other than what might become available due to slack resource becoming available.

CPU Slack:

CPU resource, there are two kinds of slack CPU resource:

Local slack becomes available when a logical/virtual CPU of a configuration is not using all the resource to which it is entitled and such slack is then used within the configuration of that CPU. Local slack is preferred over remote slack as better hit ratios on caches are expected when the slack is used within the configuration.

Remote slack becomes available when a logical/virtual CPU of a configuration is not using all the resource to which it is entitled and such slack is then used outside the configuration of that CPU. Remote slack is expected to exhibit lower hit ratios on caches, but it is still better than not running a logical/virtual CPU at all.

The goal is to maximize the CPU cache hit ratios. For a logical partition, the amount of physical-CPU resource is determined by the overall system weightings that determine the CPU resource assigned to each logical partition. For example, in a logical 3-way MP that is assigned physical-CPU resource equivalent to a single CPU, and is horizontally polarized, each logical CPU would be dispatched independently and thus receive approximately 33% physical-CPU resource. If the same configuration were to be vertically polarized, only a single logical CPU would be run and would receive approximately 100% of the assigned physical-CPU resource (high entitlement) while the remaining two logical CPUs would not normally be dispatched (low entitlement). Such resource assignment is normally an approximation. Even a low-entitlement CPU may receive some amount of resource if only to help ensure that a program does not get stuck on such a CPU. By providing a means for a control program to indicate that it understands polarization, and to receive an indication for each CPU of its polarization and, if vertical polarization, the degree of entitlement, the control program can make more-intelligent use of data structures that are generally thought to be local to a CPU vs. available to all CPUs of a configuration. Also, such a control program can avoid directing work to any low-entitlement CPU. The actual physical-CPU resource assigned might not constitute an integral number of CPUs, so there is also the possibility of one or more CPUs in an MP vertically-polarized configuration being entitled but not to a high degree, thereby resulting in such CPUs having either medium or low vertical entitlement. It is possible for any remaining low-entitlement CPUs to receive some amount of host-CPU resource. For example, this may occur when such a CPU is targeted, such as via a SIGP order and slack host-CPU resource is available. Otherwise, such a logical/virtual CPU might remain in an un-dispatched state, even if it is otherwise capable of being dispatched.

Preferably, according to the invention, a 2-bit polarization field is defined for the new CPU-type "topology-list entry" (TLE) of the STORE SYSTEM INFORMATION (STSI) instruction. The degree of vertical-polarization entitlement for each CPU is indicated as high, medium, or low. The assignment is not a precise percentage but rather is somewhat fuzzy and heuristic.

In addition to vertical polarization as a means of reassigning weighting to guest CPUs, another concept exists, which is the creation and management of slack capacity (also called "white space"). Slack capacity is created under the following circumstances:

A high-vertical CPU contributes to slack when its average utilization (AU) falls below 100 percent (100−AU).

A medium-vertical CPU that has an assigned provisioning of M percent of a host CPU contributes to slack when its average utilization (AU) falls below M percent (M−AU>0).

A low-vertical CPU does not contribute to slack.

A high-vertical CPU is not a consumer of slack.

Store System Information Instruction:

An example embodiment of a format of a Store System Information instruction FIG. 3 comprises an opcode field 'B27D', a base register field B2 and a signed displacement field D2. The instruction opcode informs the machine executing the instruction that there are implied general registers '0' and '1' associated with the instruction. An address is obtained of a second operand by adding the signed displacement field value to the contents of the general register specified by the base field. In an embodiment, when the base register field is '0', the sign extended value of the displacement field is used directly to specify the second operand. When the Store System Information instruction is fetched and executed, depending on a function code in general register 0, either an identification of the level of the configuration executing the program is placed in general register 0 or information about a component or components of a configuration is stored in a system-information block (SYSIB). When information about a component or components is requested, the information is specified by further contents of general register 0 and by contents of general register 1. The SYSIB, if any, is designated by the second-operand address. The machine is considered to provide one, two, or three levels of configuration. The levels are:

1. The basic machine, which is the machine as if it were operating in the basic or non-interpretive instruction-execution mode.
2. A logical partition, which is provided if the machine is operating in the LPAR (logically partitioned, interpretive instruction-execution) mode. A logical partition is provided by the LPAR hypervisor, which is a part of the machine. A basic machine exists even when the machine is operating in the LPAR mode.
3. A virtual machine, which is provided by a virtual machine (VM) control program that is executed either by the basic machine or in a logical partition. A virtual machine may itself execute a VM control program that provides a higher-level (more removed from the basic machine) virtual machine, which also is considered a level-3 configuration. The terms basic mode, LPAR mode, logical partition, hypervisor, and virtual machine, and any other terms related specifically to those terms, are not defined in this publication; they are defined in the machine manuals. A program being executed by a level-1 configuration (the basic machine) can request information about that configuration. A program being executed by a level-2 configuration (in a logical partition) can request information about the logical partition and about the underlying basic machine. A program being executed by a level-3 configuration (a virtual machine) can request information about the virtual machine and about the one or two underlying levels; a basic machine is always underlying, and a logical partition may or may not be between the basic machine and the virtual machine. When information about a virtual machine is requested, information is provided about the configuration executing the program and about any underlying level or levels of virtual machine. In any of these cases, information is provided about a level only if the level implements the instruction.

The function code determining the operation is an unsigned binary integer in bit positions 32-35 of general register 0 and is as follows:

| Function Code | Information Requested: |
|---|---|
| 0 | Current-configuration-level number |
| 1 | Information about level 1 (the basic machine) |
| 2 | Information about level 2 (a logical partition) |
| 3 | Information about level 3 (a virtual machine) |
| 4-14 | None; codes are reserved |
| 15 | Current-configuration-level information |

Invalid Function Code:

The level of the configuration executing the program is called the current level. The configuration level specified by a nonzero function code is called the specified level. When the specified level is numbered higher than the current level, then the function code is called invalid, the condition code is set to 3, and no other action (including checking) is performed.

Valid Function Code:

When the function code is equal to or less than the number of the current level, it is called valid. In this case, bits 36-55 of general register 0 and bits 32-47 of general register 1 must be zero or 15; otherwise, a specification exception is recognized. Bits 0-31 of general registers 0 and 1 always are ignored. When the function code is 0, an unsigned binary integer identifying the current configuration level (1 for basic machine, 2 for logical partition, or 3 for virtual machine) is placed in bit positions 32-35 of general register 0, the condition code is set to 0, and no further action is performed. When the function code is valid and nonzero, general registers 0 and 1 contain additional specifications about the information requested, as follows:

Bit positions 56-63 of general register 0 contain an unsigned binary integer, called selector 1, that specifies a component or components of the specified configuration.

Bit positions 48-63 of general register 1 contain an unsigned binary integer, called selector 2, that specifies the type of information requested.

The contents of general registers 0 and 1 are shown in FIG. 4.

When the function code is valid and nonzero, information may be stored in a system-information block (SYSIB) beginning at the second-operand location. The SYSIB is 4K bytes and must begin at a 4K-byte boundary; otherwise, a specification exception may be recognized, depending on selector 1 and selector 2 and on whether access exceptions are recognized due to references to the SYSIB.

Selector 1 can have values as follows:

| Selector 1 | Information Requested |
| --- | --- |
| 0 | None; selector is reserved |
| 1 | Information about the configuration level specified by the function code |
| 2 | Information about one or more CPUs in the specified configuration level |
| 3-255 | None; selectors are reserved |

When selector 1 is 1, selector 2 can have values as follows:
Selector 2 when

| Selector 1 Is 1 | Information Requested |
| --- | --- |
| 0 | None; selector is reserved |
| 1 | Information about the specified configuration level |
| 2 | Topology information about the specified configuration level |
| 3-65, 535 | None; selectors are reserved |

When selector 1 is 2, selector 2 can have values as follows:
Selector 2 when

| Selector 1 Is 2 | Information Requested |
| --- | --- |
| 0 | None; selector is reserved |
| 1 | Information about the CPU executing the program in the specified configuration level |
| 2 | Information about all CPUs in the specified configuration level |
| 3-65, 535 | None; selectors are reserved |

Only certain combinations of the function code, selector 1, and selector 2 are valid, as shown in FIG. 5.

When the specified function-code, selector-1, and selector-2 combination is invalid (is other than as shown in FIG. 5), or if it is valid but the requested information is not available because the specified level does not implement or does not fully implement the instruction or because a necessary part of the level is uninstalled or not initialized, and provided that an exception is not recognized, the condition code is set to 3. When the function code is nonzero, the combination is valid, the requested information is available, and there is no exception, the requested information is stored in a system-information block (SYSIB) at the second-operand address.

Some or all of the SYSIB may be fetched before it is stored.

A SYSIB may be identified in references by means of "SYSIB fc.s1.s2," where "fc," "s1," and "s2" are the values of a function code, selector 1, and selector 2, respectively.

Following sections describe the defined SYSIBs by means of figures and related text. In the figures, the offsets shown on the left are word values (a word comprising 4 bytes). "The configuration" refers to the configuration level specified by the function code (the configuration level about which information is requested).

SYSIB 1.1.1 (Basic-Machine Configuration)

Figure 6:
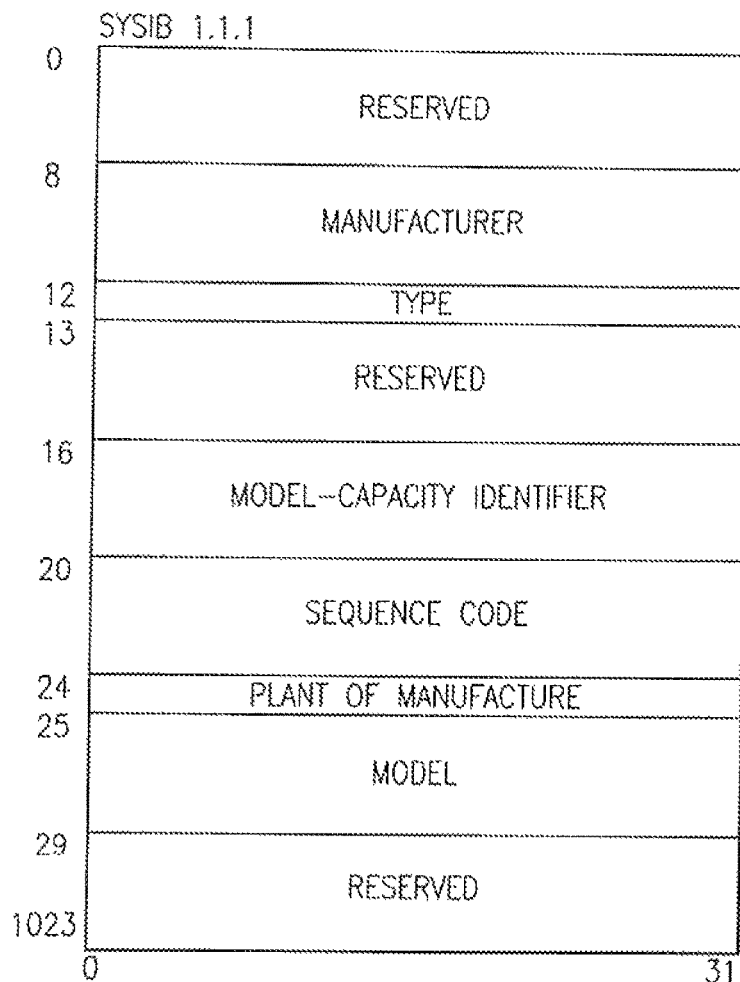
FIG. 6 depicts a prior art SYSIB 1.1.1 table.

SYSIB 1.1.1 has the format shown in FIG. 6, where the fields have the following meanings:

Reserved: The contents of words 0-7, 13-15, and 29-63 are reserved and are stored as zeros. The contents of words 64-1023 are reserved and may be stored as zeros or may remain unchanged.

Manufacturer: Words 8-11 contain the 16-character (0-9 or uppercase A-Z) EBCDIC name of the manufacturer of the configuration. The name is left justified with trailing blanks if necessary.

Type: Word 12 contains the four-character (0-9) EBCDIC type number of the configuration. (This is called the machine-type number in the definition of STORE CPU ID.)

Model-Capacity Identifier: Words 16-19 contain the 16-character (0-9 or uppercase A-Z) EBCDIC model-capacity identifier of the configuration. The model-capacity identifier is left justified with trailing blanks if necessary.

Sequence Code: Words 20-23 contain the 16-character (0-9 or uppercase A-Z) EBCDIC sequence code of the configuration. The sequence code is right justified with leading EBCDIC zeros if necessary.

Plant of Manufacture: Word 24 contains the four character (0-9 or uppercase A-Z) EBCDIC code that identifies the plant of manufacture for the configuration. The code is left justified with trailing blanks if necessary.

Model: When word 25 is not binary zeros, words 25-28 contain the 16-character (0-9 or uppercase A-Z) EBCDIC model identification of the configuration. The model identification is left justified with trailing blanks if necessary. (This is called the model number in programming note 4 on page 10-111 of STORE CPU ID.) When word 25 is binary zeros, the contents of words 16-19 represent both the model-capacity identifier and the model.

Programming Notes:

1. The fields of the SYSIB 1.1.1 are similar to those of the node descriptor described in the publication Common I/O-Device Commands and Self Description. However, the contents of the SYSIB fields may not be identical to the contents of the corresponding node-descriptor fields because the SYSIB fields:

Allow more characters.

Are more flexible regarding the type of characters allowed.

Provide information that is justified differently within the field.

May not use the same method to determine the contents of fields such as the sequence code field.

2. The model field in a node descriptor corresponds to the content of the STSI model field and not the STSI model-capacity-identifier field.
3. The model field specifies the model of the machine (i.e., the physical model); the model capacity identifier field specifies a token that may be used to locate a statement of capacity or performance in the System Library publication for the model.

SYSIB 1.2.1 (Basic-Machine CPU)

Figure 7:
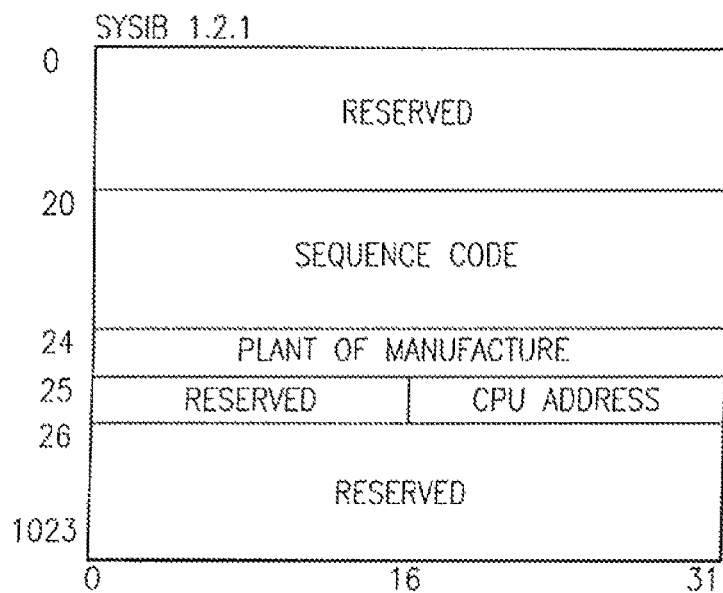
FIG. 7 depicts a prior art SYSIB 1.2.1 table.

SYSIB 1.2.1 has the format shown in FIG. 7 where the fields have the following meaning:

Reserved: The contents of words 0-19, bytes 0 and 1 of word 25, and words 26-63 are reserved and are stored as zeros. The contents of words 64-1023 are reserved and may be stored as zeros or may remain unchanged.

Sequence Code: Words 20-23 contain the 16-character (0-9 or uppercase A-Z) EBCDIC sequence code of the configuration. The code is right justified with leading EBCDIC zeros if necessary.

Plant of Manufacture: Word 24 contains the four character (0-9 or uppercase A-Z) EBCDIC code that identifies the plant of manufacture for the configuration. The code is left justified with trailing blanks if necessary.

CPU Address: Bytes 2 and 3 of word 25 contain the CPU address by which this CPU is identified in a multiprocessing configuration. The CPU address is a 16-bit unsigned binary integer. The CPU address is the same as is stored by STORE CPU ADDRESS when the program is executed by a machine operating in the basic mode.

Programming Note:

Multiple CPUs in the same configuration have the same sequence code, and it is necessary to use other information, such as the CPU address, to establish a unique CPU identity. The sequence code returned for a basic-machine CPU and a logical-partition CPU are identical and have the same value as the sequence code returned for the basic-machine configuration.

SYSIB 1.2.2 (Basic-Machine CPUs)

The format field in byte 0 of word 0 determines the format of the SYSIB. When the format field has a value of zero, SYSIB 1.2.2 has a format-0 layout as shown in FIG. 8. When the format field has a value of one, SYSIB 1.2.2 has a format-1 layout as shown in FIG. 9.

Reserved: When the format field contains a value of zero, the contents of bytes 1-3 of word 0 and words 1-6 are reserved and stored as zeros. When the format field contains a value of one, the contents of byte 1 of word 0 and words 1-6 are reserved and stored as zeros. When fewer than 64 words are needed to contain the information for all the CPUs, the portion of the SYSIB following the adjustment-factor list in a format-0 SYSIB or the alternate-adjustment-factor list in a format-1 SYSIB, up to word 63 are reserved and are stored as zeros. The contents of words 64-1023 are reserved and may be stored as zeros or may remain unchanged. When 64 or more words are needed to contain the information for all the CPUs, the portion of the SYSIB following the adjustment-factor list in a format-0 SYSIB or the alternate-adjustment-factor list in a format-1 SYSIB, up to word 1023 are reserved and may be stored as zeros or may remain unchanged.

Format: Byte 0 of word 0 contains an 8-bit unsigned binary integer that specifies the format of SYSIB 1.2.2.

Alternate-CPU-Capability Offset: When the format field has a value of one, bytes 2-3 of word 0 contain a 16-bit unsigned binary integer that specifies the offset in bytes of the alternate-CPU-capability field in the SYSIB.

Secondary CPU Capability: Word 7 contains a 32-bit unsigned binary integer that, when not zero, specifies a secondary capability that may be applied to certain types of CPUs in the configuration. There is no formal description of the algorithm used to generate this integer, except that it is the same as the algorithm used to generate the CPU capability. The integer is used as an indication of the capability of a CPU relative to the capability of other CPU models, and also relative to the capability of other CPU types within a model. The capability value applies to each of the CPUs of one or more applicable CPU types in the configuration. That is, all CPUs in the configuration of an applicable type or types have the same capability. When the value is zero, all CPUs of any CPU type in the configuration have the same capability, as specified by the CPU capability. The secondary CPU capability may or may not be the same value as the CPU-capability value. The multiprocessing-CPU-capability-adjustment factors are also applicable to CPUs whose capability is specified by the secondary CPU capability.

CPU Capability: If bits 0-8 of word 8 are zero, the word contains a 32-bit unsigned binary integer (I) in the range $0<I<2^{23}$ that specifies the capability of one of the CPUs in the configuration. If bits 0-8 of word 8 are nonzero, the word contains a 32-bit binary floating point short-format number instead of a 32-bit unsigned binary integer. Regardless of encoding, a lower value indicates a proportionally higher CPU capacity. Beyond that, there is no formal description of the algorithm used to generate this value. The value is used as an indication of the capability of the CPU relative to the capability of other CPU models. The capability value applies to each of the non-secondary CPUs in the configuration. That is, all non-secondary CPUs in the configuration have the same capability.

Total CPU Count: Bytes 0 and 1 of word 9 contain a 16-bit unsigned binary integer that specifies the total number of CPUs in the configuration. This number includes all CPUs in the configured state, the standby state, or the reserved state.

Configured CPU Count: Bytes 2 and 3 of word 9 contain a 16-bit unsigned binary integer that specifies the number of CPUs that are in the configured state. A CPU is in the configured state when it is in the configuration and available to be used to execute programs.

Standby CPU Count: Bytes 0 and 1 of word 10 contain a 16-bit unsigned binary integer that specifies the number of CPUs that are in the standby state. A CPU is in the standby state when it is in the configuration, is not available to be used to execute programs, and can be made available by issuing instructions to place it in the configured state.

Reserved CPU Count: Bytes 2 and 3 of word 10 contain a 16-bit unsigned binary integer that specifies the number of CPUs that are in the reserved state. A CPU is in the reserved state when it is in the configuration, is not available to be used to execute programs, and cannot be made available by issuing instructions to place it in the configured state. (It may be possible to place a reserved CPU in the standby or configured state by means of manual actions.)

Multiprocessing CPU-Capability Adjustment Factors: Beginning with bytes 0 and 1 of word 11, the SYSIB contains a series of contiguous two-byte fields, each containing a 16-bit unsigned binary integer used to form an adjustment factor (fraction) for the value contained in the CPU-capability field. Such a fraction is developed by using the value (V) of the first two-byte field according to one of the following methods:

If V is in the range $0<V\leq100$, a denominator of 100 is indicated which produces a fraction of V/100.

If V is in the range $101\leq V<255$, a denominator of 255 is indicated which produces a fraction of V/255.

If V is in the range $255\leq V\leq65,536$, a denominator of 65,536 is indicated which produces a fraction of V/65,536.

Thus, the fraction represented by each two-byte field is then developed by dividing the contents of a two byte field by the indicated denominator. The number of adjustment-factor fields is one less than the number of CPUs specified in the total-CPU count field. The adjustment-factor fields correspond to configurations with increasing numbers of CPUs in the configured state. The first adjustment-factor field corresponds to a configuration with two CPUs in the configured state. Each successive adjustment-factor field corresponds to a configuration with a number of CPUs in the configured state that is one more than that for the preceding field.

Alternate CPU Capability: When the format field has a value of one, if bits 0-8 of word N are zero, the word contains a 32-bit unsigned binary integer (I) in the range $0\leq I<2^{23}$ that specifies the announced capability of one of the CPUs in the configuration. If bits 0-8 of word N are nonzero, the word contains a 32-bit binary floating point short-format number instead of a 32-bit unsigned binary integer. Regardless of encoding, a lower value indicates a proportionally higher CPU capacity. Beyond that, there is no formal description of the algorithm used to generate this value. The value is used as an indication of the announced capability of the CPU relative to the announced capability of other CPU models. The alternate-capability value applies to each of the CPUs in the configuration. That is, all CPUs in the configuration have the same alternate capability.

Alternate Multiprocessing CPU-Capability Adjustment Factors: Beginning with bytes 0 and 1 of word N+1, the SYSIB contains a series of contiguous two-byte fields, each containing a 16-bit unsigned binary integer used to form an adjustment factor (fraction) for the value contained in the alternate-CPU-capability field. Such a fraction is developed by using the value (V) of the first two-byte field according to one of the following methods:

If V is in the range $0<V\leq100$, a denominator of 100 is indicated which produces a fraction of V/100.

If V is in the range $101\leq V<255$, a denominator of 255 is indicated which produces a fraction of V/255.

If V is in the range $255\leq V<65,536$, a denominator of 65,536 is indicated which produces a fraction of V/65,536.

Thus, the fraction represented by each two-byte field is then developed by dividing the contents of a two byte field by the indicated denominator. The number of alternate-adjustment-factor fields is one less than the number of CPUs specified in the total-CPU-count field. The alternate-adjustment-factor fields correspond to configurations with increasing numbers of CPUs in the configured state. The first alternate-adjustment-factor field corresponds to a configuration with two CPUs in the configured state. Each successive alternate-adjustment-factor field corresponds to a configuration with a number of CPUs in the configured state that is one more than that for the preceding field.

SYSIB 15.1.2 (Configuration Topology)

SYSIB 15.1.2 has the format shown in FIG. 10. The fields have the meanings as follows:

Reserved: The contents of bytes 0-1 of word 0, byte 2 of word 2, and word 3 are reserved and are stored as zeros. The contents of words N–1023 are reserved and may be stored as zeros or may remain unchanged.

Length: Bytes 2-3 of word 0 contain a 16-bit unsigned binary integer whose value is the count of bytes of the entire SYSIB 15.1.2. The length of just the topology list is determined by subtracting 16 from the length value in bytes 2-3 of word 0. N in FIG. 10 is determined by evaluating the formula N=Length/4.

Mag1-6: Word 1 and bytes 0-1 of word 2 constitute six one-byte fields where the content of each byte indicates the maximum number of container-type topology-list entries (TLE) or CPU-type TLEs at the corresponding nesting level. CPU-type TLEs are always found only at the Mag1 level. Additionally, the Mag1 value also specifies the maximum number of CPUs that may be represented by a container-type TLE of the Mag2 level. When the value of the nesting level is greater than one, containing nesting levels above the Mag1 level are occupied only by container-type TLEs. A dynamic change to the topology may alter the number of TLEs and the number of CPUs at the Mag1 level, but the limits represented by the values of the Mag1-6 fields do not change within a model family of machines.

The topology is a structured list of entries where an entry defines one or more CPUs or else is involved with the nesting structure. The following illustrates the meaning of the magnitude fields:

When all CPUs of the machine are peers and no containment organization exists, other than the entirety of the central-processing complex itself, the value of the nesting level is 1, Mag1 is the only non-zero magnitude field, and the number of CPU-type TLEs stored does not exceed the Mag1 value.

When all CPUs of the machine are subdivided into peer groups such that one level of containment exists, the value of the nesting level is 2, Mag1 and Mag2 are the only non-zero magnitude fields, the number of container-type TLEs stored does not exceed the Mag2 value, and the number of CPU-type TLEs stored within each container does not exceed the Mag1 value.

The Mag3-6 bytes similarly become used (proceeding in a right-to-left direction) when the value of the nesting level falls in the range 3-6.

MNest: Byte 3 of word 2 specifies the nesting level of the topology to which the configuration may be extended while continuing to allow the guest program to survive. The maximum MNest value is six; the minimum is one. If MNest is one, there is no actual TLE nesting structure, Mag1 is the only non-zero field in the Mag1-6 range, and only CPU-type TLEs are represented in the topology list. The MNest value indicates the number of non-zero magnitude values beginning with the magnitude field at byte of word 2 (Mag1), proceeding left when MNest is greater than one, and with the remaining magnitude fields stored as zeros.

The value of MNest is the maximum possible nesting. No dynamic configuration change exceeds this limit.

Topology List: Words of FIG. 10 in the range 4 through N−1 specify a list of one or more topology-list entries (TLE). Each TLE is an eight-byte or sixteen-byte field; thus N is an even number of words, and a corollary is that a TLE always starts on a doubleword boundary.

Topology-List Entries: The first TLE in the topology list begins at a nesting level equal to MNest-1. The entire topology list represents the configuration of the issuer of the STSI instruction specifying SYSIB 15.1.2; no outermost container TLE entry is used as it would be redundant with the entire list, and the entire configuration. There-fore, the highest nesting level may have more than a single peer container.

FIGS. 11 and 12 illustrate the types of TLEs, wherein fields have the following definitions:

Nesting Level (NL): Byte 0 of word 0 specifies the TLE nesting level.

| NL | Meaning |
|---|---|
| 0 | The TLE is a CPU-type TLE. |
| 1-5 | The TLE is a container-type TLE. The first container-type TLE stored in a topology list or a parent container has a container-ID in the range 1-255. If sibling containers exist within the same parent, they proceed in an ascending order of container IDs, that may or may not be consecutive, to a maximum value of 255. |
| 06-FF | Reserved. |

Sibling TLEs have the same value of nesting level which is equivalent to either the value of the nesting level minus one of the immediate parent TLE, or the value of MNest minus one, because the immediate parent is the topology list rather than a TLE.

Reserved, 0: For a container-type TLE, bytes 1-3 of word 0 and bytes 0-2 of word 1 are reserved and stored as zeros. For a CPU-type TLE, bytes 1-3 of word 0 and bits 0-4 of word 1 are reserved and stored as zeros.

Container ID:

Byte four of word 1 of a container-type TLE specifies an 8-bit unsigned non-zero binary integer whose value is the identifier of the container. The container ID for a TLE is unique within the same parent container.

Dedicated (D):

Bit 5 of word 1 of a CPU-type TLE, when one, indicates that the one or more CPUs represented by the TLE are dedicated. When D is zero, the one or more CPUs of the TLE are not dedicated.

Polarization (PP):

Bits 6-7 of word 1 of a CPU-type TLE specify the polarization value and, when polarization is vertical, the degree of vertical polarization also called entitlement (high, medium, low) of the corresponding CPU(s) represented by the TLE. The following values are used:

PP Meaning:

The one or more CPUs represented by the TLE are horizontally polarized.

The one or more CPUs represented by the TLE are vertically polarized. Entitlement is low.

The one or more CPUs represented by the TLE are vertically polarized. Entitlement is medium.

The one or more CPUs represented by the TLE are vertically polarized. Entitlement is high.

Polarization is only significant in a logical and virtual multiprocessing configuration that uses shared host processors and addresses how the resource assigned to a configuration is applied across the CPUs of the configuration. When horizontal polarization is in effect, each CPU of a configuration is guaranteed approximately the same amount of resource. When vertical polarization is in effect, CPUs of a configuration are classified into three levels of resource entitlement: high, medium, and low.

Both subsystem reset and successful execution of the SIGP set-architecture order specifying ESA/390 mode place a configuration and all of its CPUs into horizontal polarization. The CPUs immediately affected are those that are in the configured state. When a CPU in the standby state is configured, it acquires the current polarization of the configuration and causes a topology change of that configuration to be recognized.

A dedicated CPU is either horizontally or vertically polarized. When a dedicated CPU is vertically polarized, entitlement is always high. Thus, when D is one, PP is either 00 binary or 11 binary.

CPU Type:

Byte 1 of word 1 of a CPU-type TLE specifies an 8-bit unsigned binary integer whose value is the CPU type of the one or more CPUs represented by the TLE. The CPU-type value specifies either a primary-CPU type or any one of the possible secondary-CPU types.

CPU-Address Origin:

Bytes 2-3 of word 1 of a CPU-type TLE specify a 16-bit unsigned binary integer whose value is the CPU address of the first CPU in the range of CPUs represented by the CPU mask, and whose presence is represented by the value of bit position 0 in the CPU mask. A CPU-address origin is evenly divisible by 64. The value of a CPU-address origin is the same as that stored by the STORE CPU ADDRESS (STAP) instruction when executed on the CPU represented by bit position 0 in the CPU mask.

CPU Mask:

Words 2-3 of a CPU-type TLE specify a 64-bit mask where each bit position represents a CPU. The value of the CPU-address origin field plus a bit position in the CPU mask equals the CPU address for the corresponding CPU. When a CPU mask bit is zero, the corresponding CPU is not represented by the TLE. The CPU is either not in the configuration or else must be represented by another CPU-type TLE.

When a CPU mask bit is one, the corresponding CPU has the modifier-attribute values specified by the TLE, is in the topology of the configuration, and is not present in any other TLE of the topology.

Thus, for example, if the CPU-address origin is a value of 64, and bit position 15 of the CPU mask is one, CPU 79 is in the configuration and has the CPU type, polarization, entitlement, and dedication as specified by the TLE.

TLE Ordering:

The modifier attributes that apply to a CPU-type TLE are CPU type, polarization, entitlement, and dedication. Polarization and entitlement (for vertical polarization) are taken as a single attribute, albeit with four possible values (horizontal, vertical-high, vertical-medium, and vertical-low).

A single CPU TLE is sufficient to represent as many as 64 CPUs that all have the same modifier-attribute values.

When more than 64 CPUs exist, or the entire range of CPU addresses are not covered by a single CPU-address origin, and the modifier attributes are constant, a separate sibling CPU TLE is stored for each CPU-address origin, as necessary, in ascending order of CPU-address origin. Each such TLE stored has at least one CPU represented. The collection of one or more such CPU TLEs is called a CPU-TLE set.

When multiple CPU types exist, a separate CPU-TLE set is stored for each, in ascending order of CPU type.

When multiple polarization-and-entitlement values exist, a separate CPU-TLE set is stored for each, in descending order of polarization value and degree (vertical high, medium, low, then horizontal). When present, all polarization CPU-TLE sets of a given CPU type are stored before the next CPU-TLE set of the next CPU type.

When both dedicated and not-dedicated CPUs exist, a separate CPU-TLE set is stored for each, dedicated appearing before not-dedicated. All TLEs are ordered assuming a depth-first traversal where the sort order from major to minor is as follows:
 1. CPU type
   a. Lowest CPU-type value
   b. Highest CPU-type value
 2. Polarization-Entitlement
   a. Vertical high
   b. Vertical medium
   c. Vertical low
   d. Horizontal
 3. Dedication (when applicable)
   a. Dedicated
   b. Not dedicated The ordering by CPU-address origin and modifier attributes of sibling CPU TLEs within a parent container is done according to the following list, which proceeds from highest to lowest.
 1. CPU-TLE set of lowest CPU-type value, vertical high, dedicated
 2. CPU-TLE set of lowest CPU-type value, vertical high, not-dedicated
 3. CPU-TLE set of lowest CPU-type value, vertical medium, not-dedicated
 4. CPU-TLE set of lowest CPU-type value, vertical low, not-dedicated
 5. CPU-TLE set of lowest CPU-type value, horizontal, dedicated
 6. CPU-TLE set of lowest CPU-type value, horizontal, not-dedicated
 7. CPU-TLE set of highest CPU-type value, vertical high, dedicated
 8. CPU-TLE set of highest CPU-type value, vertical high, not-dedicated
 9. CPU-TLE set of highest CPU-type value, vertical medium, not-dedicated
 10. CPU-TLE set of highest CPU-type value, vertical low, not-dedicated
 11. CPU-TLE set of highest CPU-type value, horizontal, dedicated
 12. CPU-TLE set of highest CPU-type value, horizontal, not-dedicated Other TLE Rules:
 1. A container-type TLE is located at nesting levels in the range 1-5.
 2. A CPU-type TLE is located at nesting level 0.
 3. The number of sibling container-type TLEs in a topology list or a given parent container does not exceed the value of the magnitude byte (Mag2-6) of the nesting level corresponding to the siblings.
 4. The number of CPUs represented by the one or more CPU-type TLEs of the parent container does not exceed the value of the Mag1 magnitude byte.
 5. The content of a TLE is defined as follows:
   a. If a TLE is a container-type TLE, the content is a list that immediately follows the parent TLE, comprised of one or more child TLEs, and each child TLE has a nesting level of one less than the nesting level of the parent TLE or topology-list end.
   b. If a TLE is a CPU-type TLE, the content is one or more CPUs, as identified by the other fields of a CPU TLE.
 6. When the first TLE at a nesting level is a CPU entry, the maximum nesting level 0 has been reached.

Programming Note:

A possible examination process of a topology list is described. Before an examination of a topology list is begun, the current-TLE pointer is initialized to reference the first or top TLE in the topology list, the prior-TLE pointer is initialized to null, and then TLEs are examined in a top-to-bottom order.

As a topology-list examination proceeds, the current-TLE pointer is advanced by incrementing the current-TLE pointer by the size of the current TLE to which it points. A container-type TLE is advanced by adding eight to the current-TLE pointer. A CPU-type TLE is advanced by adding sixteen to the current-TLE pointer. The process of advancing the current-TLE pointer includes saving its value as the prior-TLE pointer just before it is incremented. TLE examination is not performed if the topology list has no TLEs.

The examination process is outlined in the following steps:
 1. If the current-TLE nesting level is zero, and the prior-TLE nesting level is null or one, the current TLE represents the first CPU-type TLE of a group of one or more CPU-type TLEs. The program should perform whatever action is appropriate for when a new group of one or more CPUs is first observed. Go to step 5.
 2. If the current-TLE nesting level is zero, and the prior-TLE nesting level is zero, the current TLE represents a subsequent CPU-type TLE of a group of CPU-type TLEs that represent siblings of the CPUs previously observed in steps 1 or 2. The program should perform whatever action is appropriate for when the size of an existing sibling group of one or more CPUs is increased. Go to step 5.
 3. If the current-TLE nesting level is not zero, and the prior-TLE nesting level is zero, the prior TLE represents a last or only CPU-type TLE of a group of one or more CPU-type TLEs. The program should perform whatever action is appropriate for when an existing group of one or more CPUs is completed. Go to step 5.
 4. Go to step 5.

By elimination, this would be the case where the current-TLE nesting level is not zero, and the prior-TLE nesting level is not zero. If the current-TLE nesting level is less than the prior-TLE nesting level, the direction of topology-list traversal is toward a CPU-type TLE. If the current-TLE nesting level is greater than the prior-TLE nesting level, the direction of topology-list traversal is away from a CPU-type TLE. Container-type TLEs are being traversed leading to either (1) another group of CPU-type TLEs that are a separate group in the overall topology, or (2) the end of the topology list. In either case, no particular processing is required beyond advancing to the next TLE.

5. Advance to the next TLE position based upon the type of the current TLE. If the advanced current-TLE pointer is equivalent to the end of the topology list:
   a. No more TLEs of any type exist.
   b. If the prior-TLE nesting level is zero, the program should perform whatever action is appropriate for when an existing group of one or more CPUs is completed.
   c. The examination is complete.

Otherwise, go to step 1.

Figure 16:
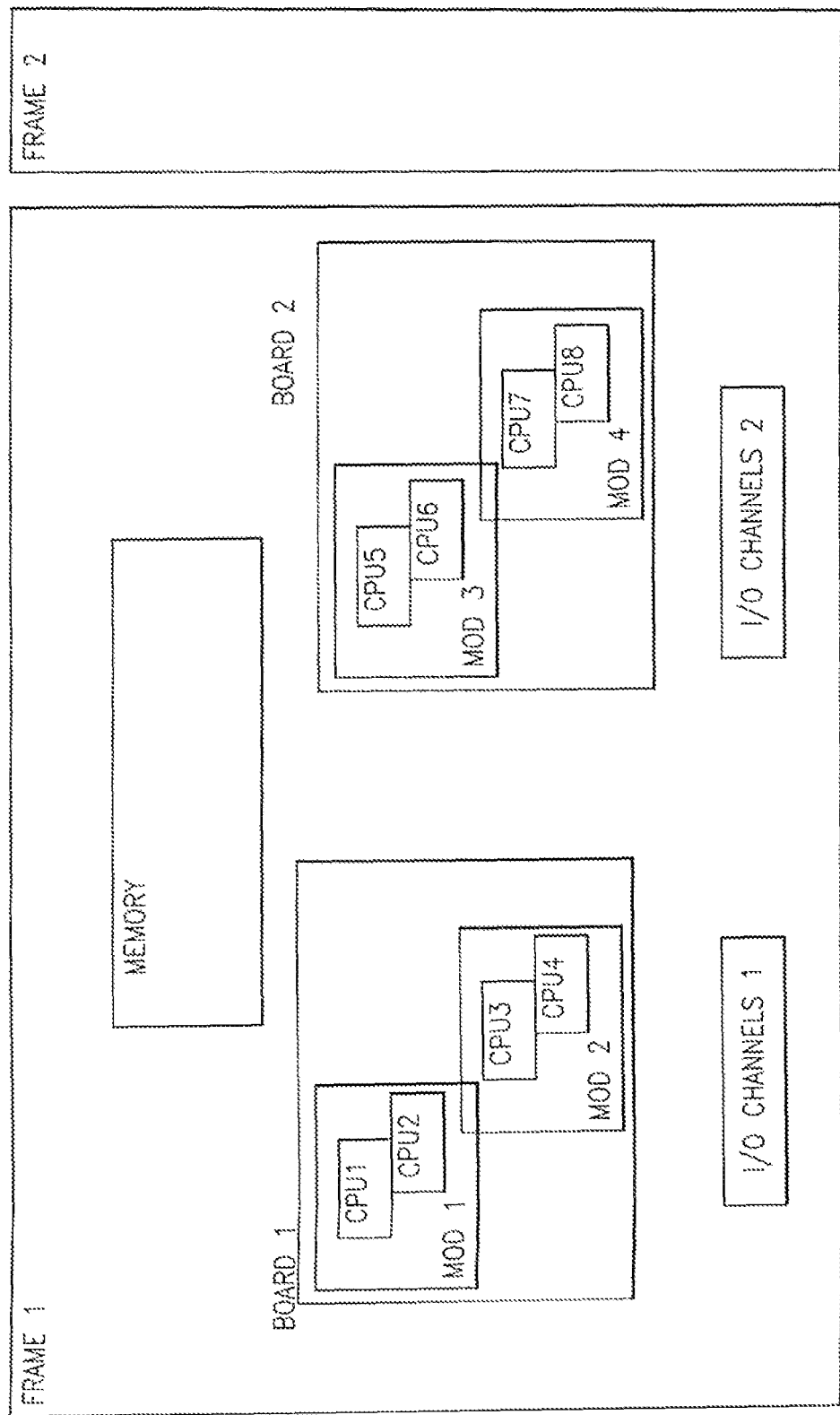
FIG. 16 depicts an example computer system.

In an example implementation, FIG. 16, a computer system comprises two physical frames (Frame 1 and Frame 2). Each frame contains two logic boards (Board 1 and Board 2), main storage (Memory), and I/O adapters (I/O Channels 1 and I/O Channels 2) for communicating with peripheral devices and networks. Each Board contains two multi-chip modules (Mod 1, Mod 2, Mod 3 and Mod 4). Each multi-chip module contains two processors (CPU1, CPU2, CPU3, CPU4, CPU5, CPU6 CPU7 and CPU8). Each module also contains a level-2 Cache (Cache 1, Cache 2, Cache 3 and Cache 4). Each processor (Central Processing Unit or CPU), includes a level-1 Cache and Translation-Lookaside-Buffer (TLB). The TLB buffers address translation information during dynamic address translation.

Figure 17:
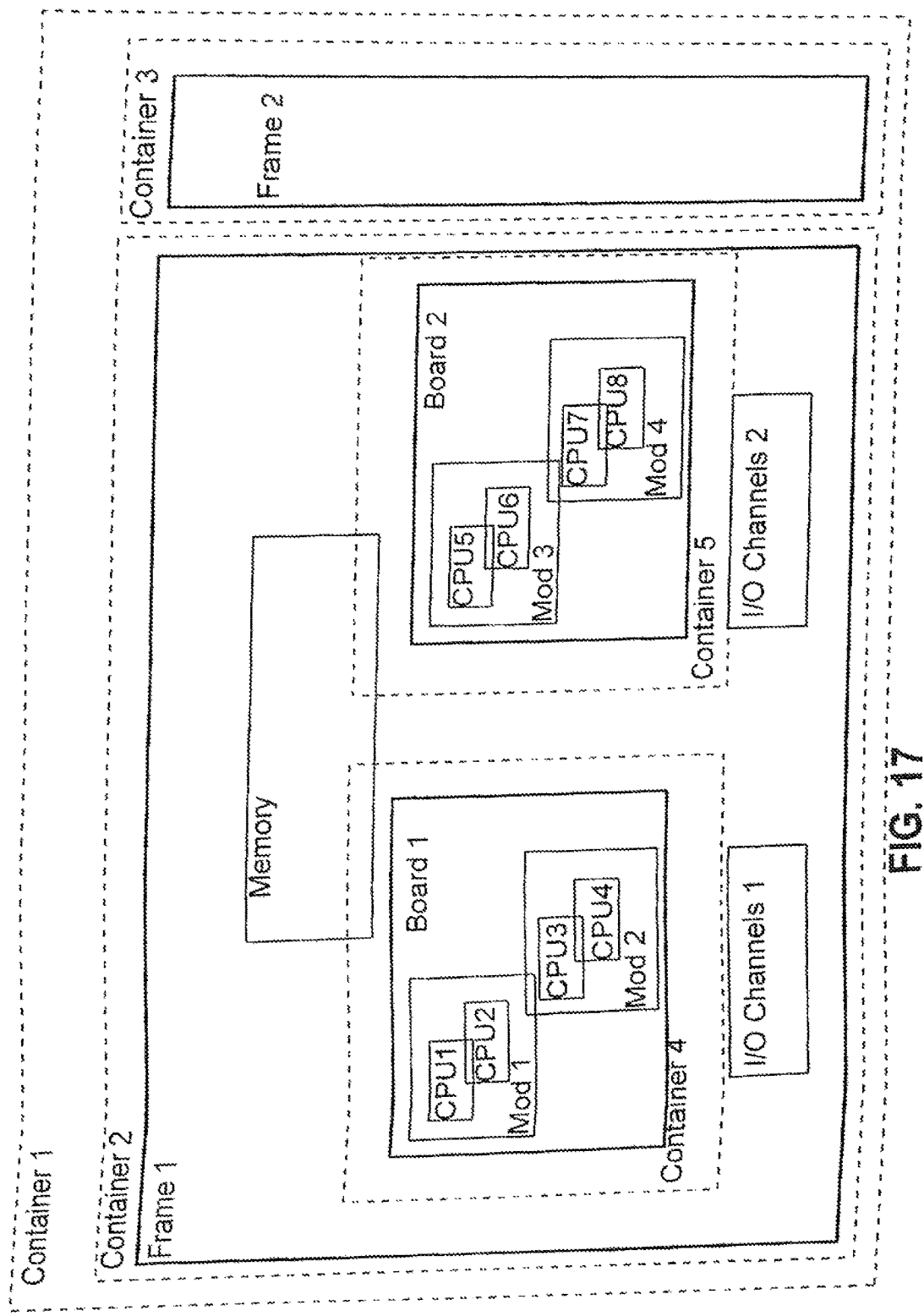
FIGS. 17-19 depicts containers of the example computer system.
Figure 18:
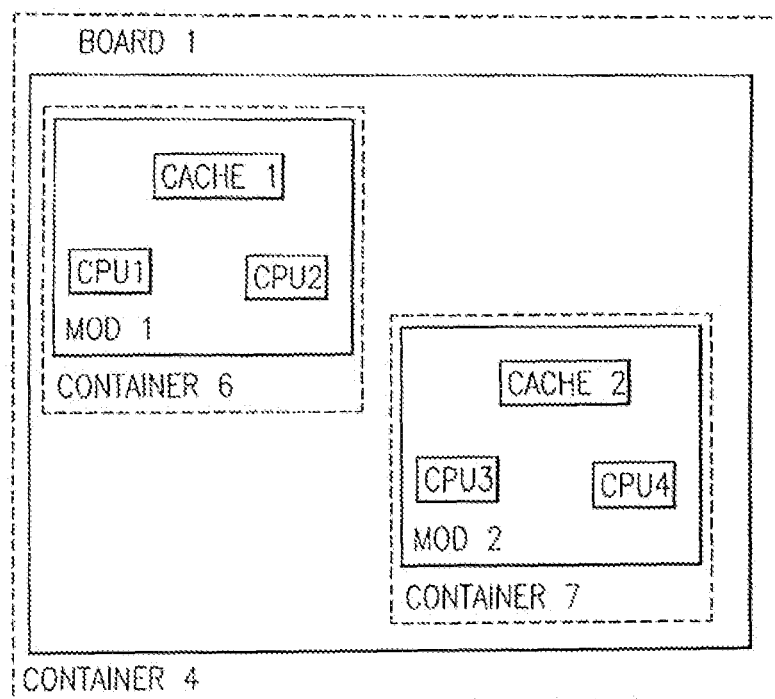
Figure 19:
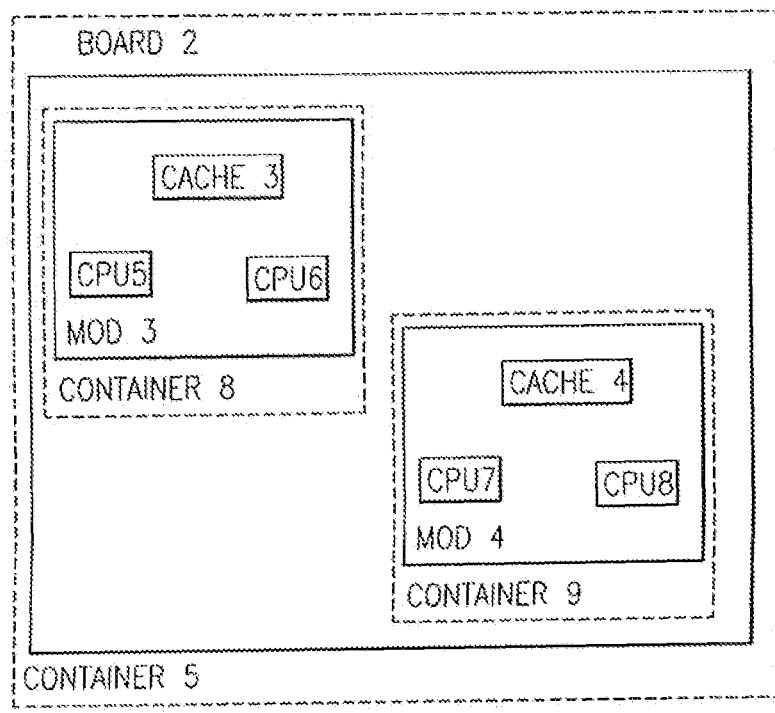
Figure 20:
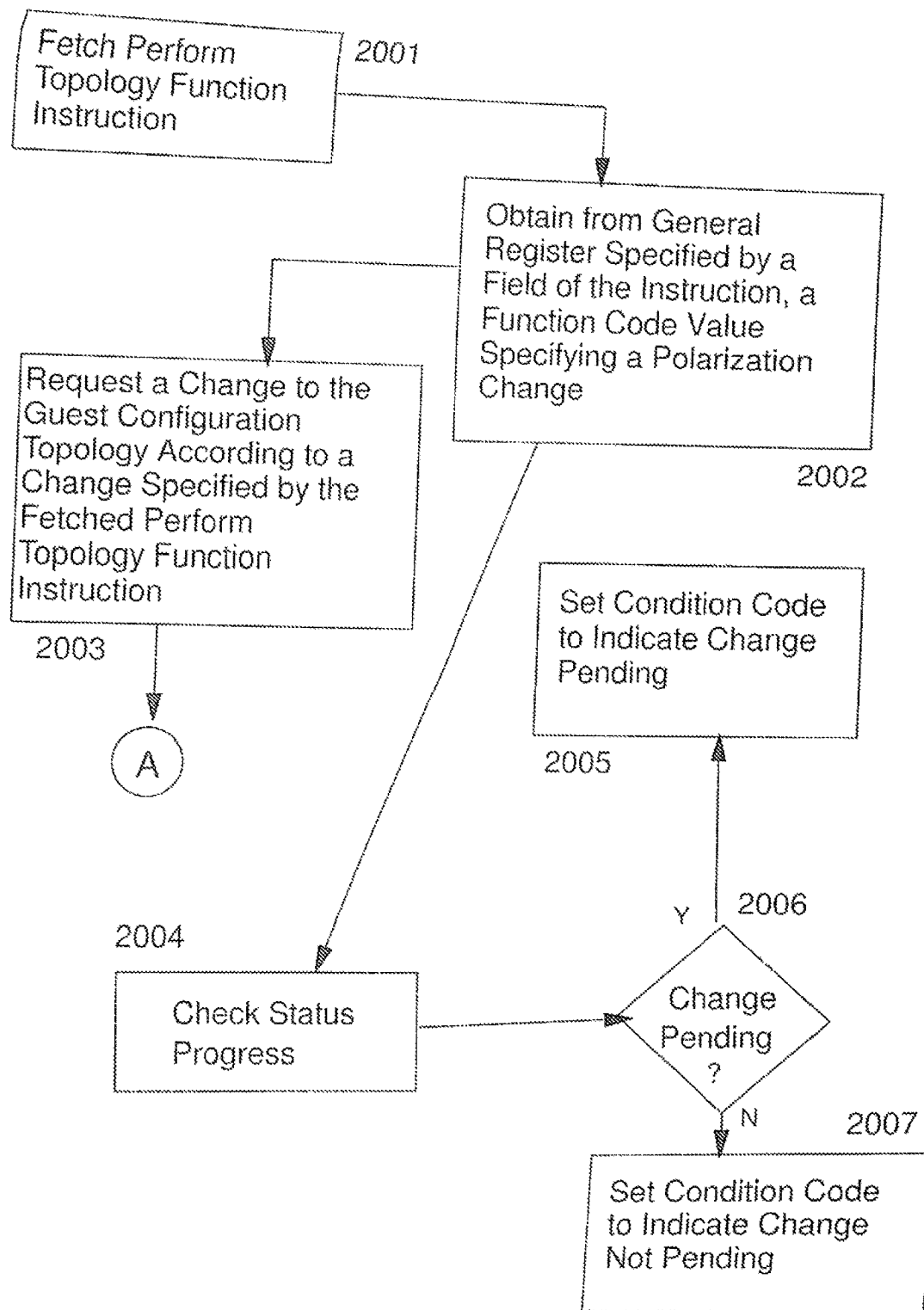
FIGS. 20-21 depict a flow of an embodiment of the invention.
Figure 21:
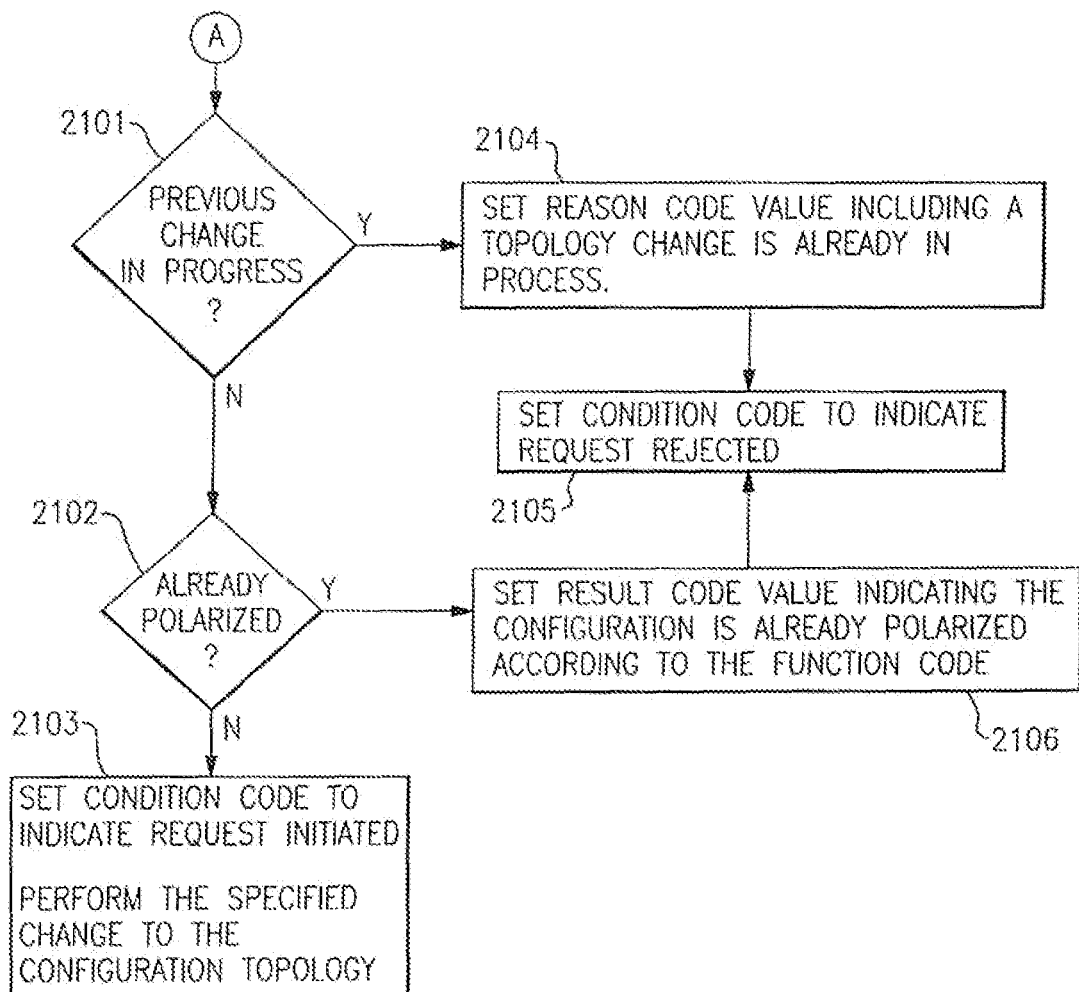

According to the invention, FIGS. 17, 18 and 19 the components of the computer system are assigned to "containers" according to proximity. Each module is assigned to inner-most containers 6, 7, 8 and 9 as the CPU's of each module are in most close proximity to each other. Since the modules are packaged on boards, the modules of the respective boards are assigned to next level containers 4 and 5. The next higher proximity grouping is the Frame. The boards of a frame are assigned to a container representing the frame (containers 2 and 3). The whole system is represented by container 1.

It can be seen that two CPUs on the same module such as CPU1 and CPU2 are in closest topological relationship or distance to each other and that both reside in one container (container 6) and no container boundary is crossed when only those CPUs are involved. However, if CPU1 and CPU8 are involved, there are 4 container boundaries crossed. CPU1 in container 6 is separated by container 4, 5 and 9 from CPU8. Therefore, knowing the container structure, a user can get a view of the topology of the system.

Of course, in a logically partitioned system, CPUs may be shared between operating systems as previously discussed. Therefore, if a logical partition was assigned 3 logical CPUs, each logical CPU assigned to 20% of each of three real CPUs, the partition would perform best if the 3 real CPUs were in closest proximity to each other as communication between CPUs and CPU resources (cache and memory for example) would perform best. In our example, CPU1 and CPU2 in a partition would experience less thrashing of cache lines in Cache 1 than if the two CPUs were CPU1 and CPU8.

In the Example, a partition is created including CPU1, CPU2 and CPU3. A program operating in the partition issues a STSI instruction and a SYSIB 15.1.2 (FIG. 10) table is returned to the program. In this case, partition comprises container 6 and container 7 and therefore there are two levels of nesting. The SYSIB table values are:

The MNest field is set to 4 indicating that the topology includes 4 levels of nesting, which is an absolute maximum nesting for the model, and may or may not be fully exploited on any arbitrary topology list, depending on resource assignment to the guest configuration issuing STSI, and how resources are assigned to other guest configurations of the system.

The Mag1 field is set to 2 indicating 2 CPUs are available at the most primitive first level.

The Mag2 field is set to 2 indicating that 2 second level (Module) containers are available.

The Mag3 field is set to 2 indicating 2 third level (Boards) are available.

The Mag4 field is set to 2 indicating 2 fourth level (Frames) are available.

In our example, the 3 CPUs are contained in two modules on the same board, therefore the following 4 TLE entries are provided:

1. NL=1; CtnrID=1 (container 6)
2. NL=0; CPU type=1 (the type of CPU's); CPU Addr Origin=0; CPU Mask 0110 . . . 00 (CPU1 and CPU2 of the addressed CPU's)
3. NL=1; CtnrID=2 (container 7)
4. NL=0; CPU type=1 (the type of CPU's); CPU Addr Origin=0; CPU Mask 00010 . . . 00 (CPU3 of the addressed CPU's)

Thus, the program has a representation of the topology based on the container and CPU TLE's returned.

Perform Topology Function (PTF)

Figure 13:
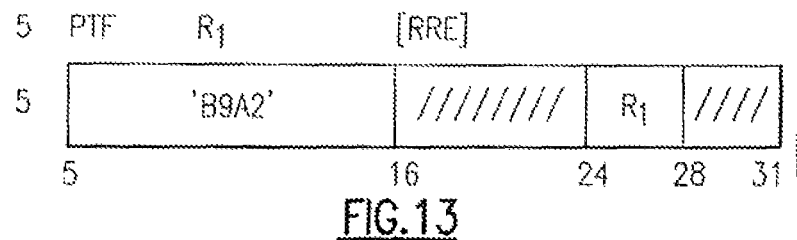
FIG. 13 depicts an instruction format of a PTF machine instruction according to the invention.
Figure 14:
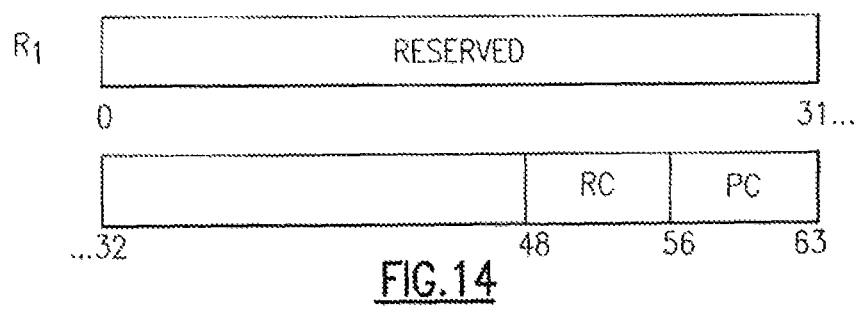
FIG. 14 depicts a register format of the PTF instruction.
Figure 15A:
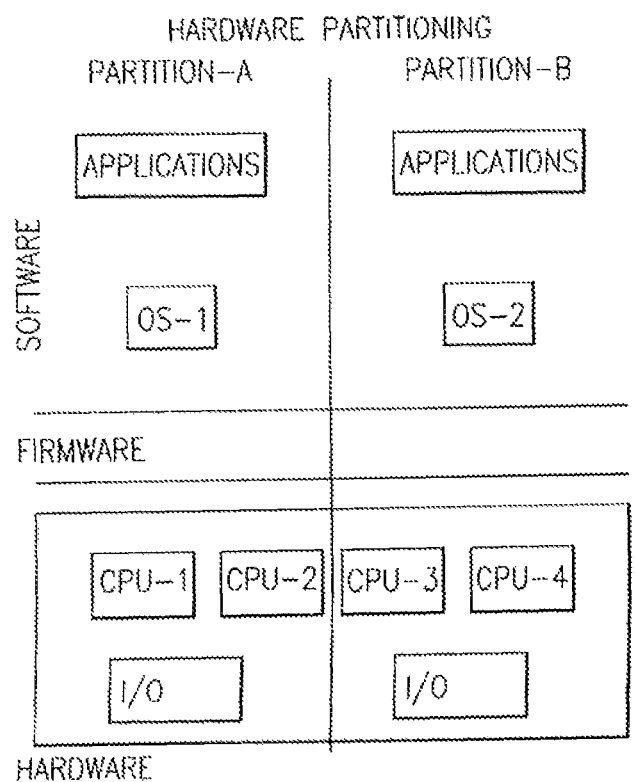
FIGS. 15A-15D depict prior art elements of partitioned computer systems.
Figure 15B:
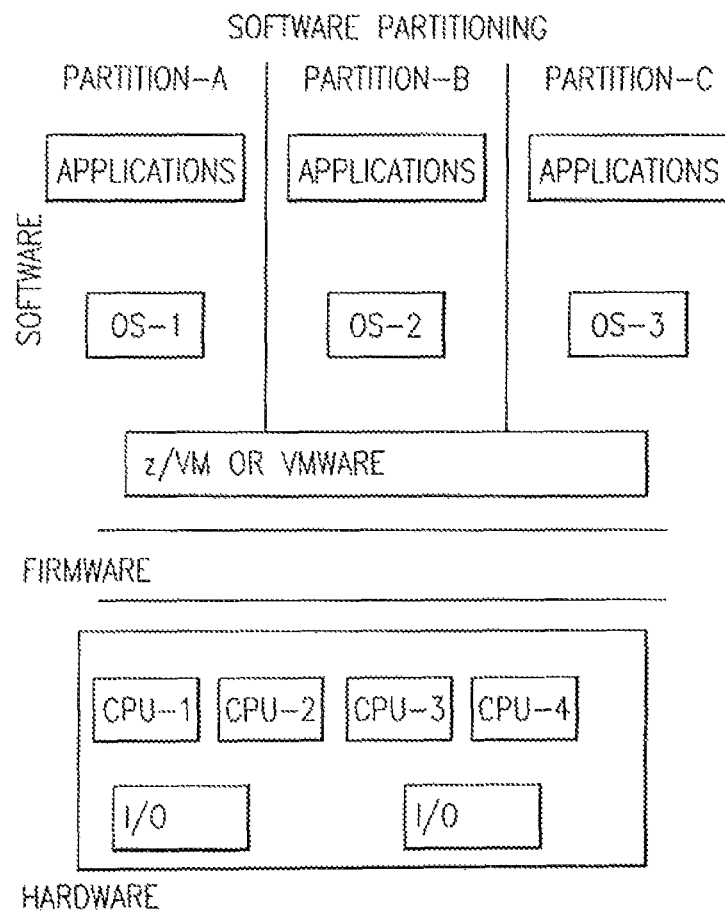
Figure 15C:
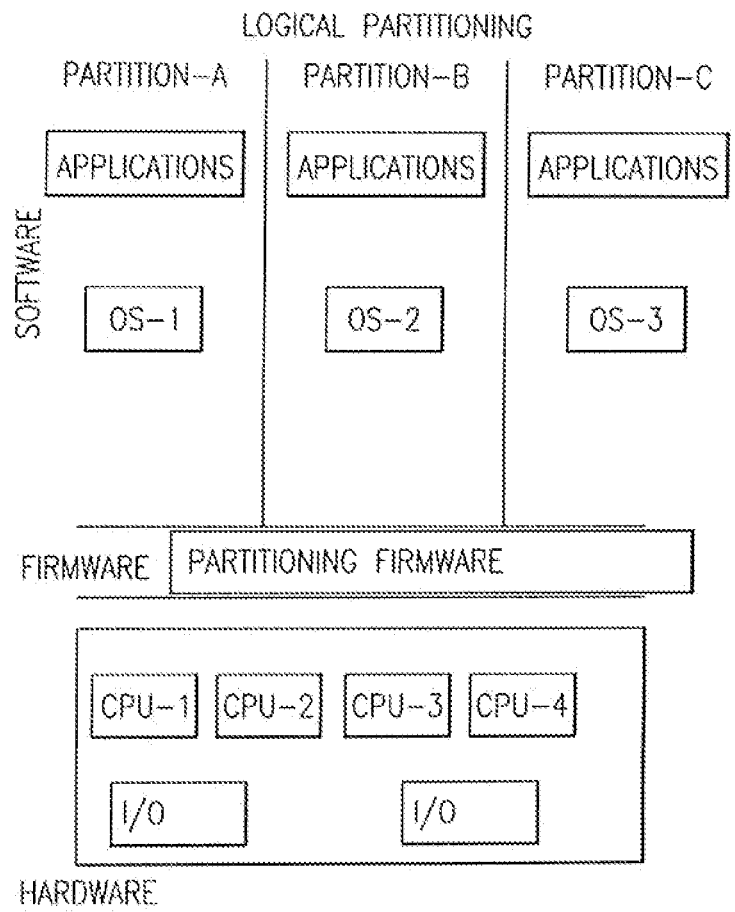
Figure 15D:
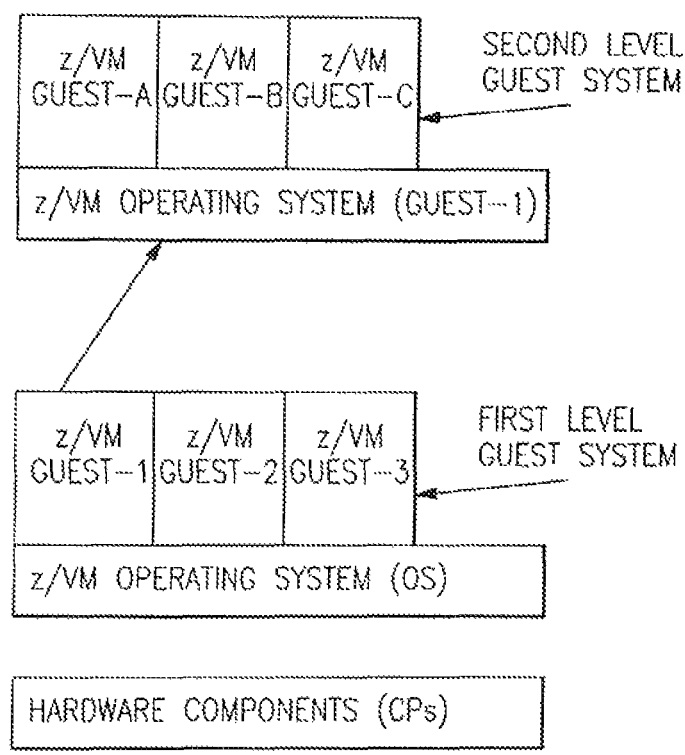

Referring to FIG. 13, a Perform Topology Function (PTF) instruction preferably comprises an opcode and a register field R1 identifying a first operand. The contents of the general register identified by R1 specify a function code in bit positions 56-63, as illustrated in FIG. 14.

The defined function codes are as follows:

| FC | Meaning |
| --- | --- |
| 0 | Request horizontal polarization. |
| 1 | Request vertical polarization. |
| 2 | Check topology-change status. |

Undefined function codes in the range 0-255 are reserved for future extensions.

Upon completion, if condition code 2 is set, a reason code is stored in bit positions 48-55 of general register R1. Bits 16-23 and 28-31 of the instruction are ignored.

Operation of Function Code 0:

Execution completes with condition code for any of the following reasons and (reason codes):

No reason specified (0).

The requesting configuration is already horizontally polarized (1).

A topology change is already in process (2).

Otherwise, a process is initiated to place all CPUs in the configuration into horizontal polarization.

Completion of the process is asynchronous with respect to execution of the instruction and may or may not be completed when execution of the instruction completes.

Resulting Condition Code:

| | |
| --- | --- |
| 0 | Topology-change initiated |
| 1 | — |
| 2 | request rejected |
| 3 | — |

Operation of Function Code 1:

Execution completes with condition code 2 for any of the following reasons and (reason codes):

No reason specified (0).

The requesting configuration is already vertically polarized (1).

A topology change is already in process (2).

Otherwise, a process is initiated to place all CPUs in the configuration into vertical polarization. Completion of the process is asynchronous with respect to execution of the instruction and may or may not be completed when execution of the instruction completes.

Resulting Condition Code:

| | |
|---|---|
| 0 | Topology-change initiated |
| 1 | — |
| 2 | Request rejected |
| 3 | — |

Operation of Function Code 2:

The topology-change-report-pending condition is checked, and the instruction completes with the condition code set.

Resulting Condition Code:

| | |
|---|---|
| 0 | Topology-change-report not pending |
| 1 | Topology change report pending |
| 2 | — |
| 3 | — |

A topology change is any alteration such that the contents of a SYSIB 15.1.2 would be different from the contents of the SYSIB 15.1.2 prior to the topology change.

A topology-change-report-pending condition is created when a topology-change process completes. A topology-change-report-pending condition is cleared for the configuration when any of the following is performed:

Execution of PERFORM TOPOLOGY FUNCTION specifies function-code 2 that completes with condition code 1.

STORE SYSTEM INFORMATION for SYSIB 15.1.2 is successfully executed by any CPU in the configuration.

Subsystem reset is performed.

Special Conditions:

If bit positions 0-55 of general register R1 are not zeros, a specification exception is recognized. If an undefined function code is specified, a specification exception is recognized.

Program Exceptions:

Operation (Configuration-topology facility is not installed)

Privileged operation

Specification

A Mainframe Example Environment

As high end server architectures increase the number of physical processors and processor speeds continue to improve, the processor "nest" needed to build large machines continues to be made of smaller building blocks that are more nodal in nature. For instance, while the L2 cache of a z990 or z9 machine is fully cache coherent, the fully populated models actually have four (4) separate L2s that are connected by a fabric to present the appearance of a single L2 cache. The penalty for going off node to resolve a cache miss continues to increase. For instance, resolving an L1 miss in a remote L2 is more expensive than resolving it in the local L2. Missing in a CP's private, usually on chip, L1 cache is expensive to start with and having to go all the way out to memory can seem like an eternity. The increase in speed of memory and the connections to it are not keeping pace with increases in processor speed. While one might want to try to pack everything closer together "on chip" or the like, power consumption and cooling issues run counter to this.

With the introduction of z990, LPAR became aware of the machine topology and began optimizing the allocation of logical partition CP and storage resources to the physical resources. Enhancements to the capabilities for dynamically re-optimizing logical partition resource assignments were introduced with z9 GA-1 primarily in support of concurrent book repair.

The new support discussed here addresses the true start of having zSeries OS software become aware of the topology of the machine, presented as a logical partition topology, to then provide affinity dispatching with regards to CPU placement in the CEC book structure.

You can think of the way zSeries LPAR manages shared logical partitions today as being horizontally polarized. That is, the processing weight for the logical partition is equally divided between all the online logical CPs in the logical partition. This support introduces a new, optional form of polarization for managing the shared logical CPs of a logical partition called vertical polarization.

When a logical partition chooses to run in vertical mode, software issues a new instruction to inform the zSeries hypervisor of this and the hypervisor will change how it dispatches the logical partition.

Depending on the configuration of the vertical logical partition, logical processors would have high, medium or low polarity. Polarity describes the amount of physical processor share vertical logical processors are entitled to. Customers define weights for logical partitions which effectively defines the amount of physical processor cycles each logical partition in a machine is entitled to.

Polarity is measured by the ratio of a logical partition's current weight to the number of logical processors configured to the logical partition. High polarity processors have close to 100% CPU share. Medium Polarity processors have >0 to 99% shares and low polarity processors have 0% share (or very close to it). High polarity logical CPs will be assigned a physical processor to run on very similar to dedicated CPs but the shared high polarity CP can still give up the physical resource and allow other shared CPs to use its excess cycles. The key here then becomes that software sees the logical topology and tries to exploit the highly polarized logical CPs for its work queues.

For example, a customer configures a three-way processor with 2 logical partitions, each with 2 logical processors and each with a weight of 50. If the first logical partition defined itself as vertical, it would have 1 high and 1 medium polarity logical CP.

Note that when a logical partition chooses to run in vertical mode, the entire logical partition runs in vertical mode. This includes all of its secondary processors such as zAAPs (IFAs) and/or zIIPs. It is the responsibility of the customer to define weights to all of the processor types for these logical partitions that will achieve the desired level of vertical processing for each type.

Logical Partition Topology Support

Establish infrastructure for a logical partition nodal topology.

Make any changes needed to LPAR's nodal assignment algorithms for existing horizontal partitions needed to provide a valid topology.

Provide instruction simulation for the new configuration topology information block for the Store System Information (STSI) instruction to provide logical partition nodal topology to the logical partition.

Examine changes to the physical or logical configuration to determine if a topology change is needed. These can occur when:
- A physical CP is added or removed from the configuration
- A logical CP is added or removed from the configuration
- A logical partition is activated
- A logical partition is deactivated
- The logical partition weights are changed from the HMC/SE Software initiation of changes a logical partition's weight.
- A logical partition is reset (switch to horizontal).
- A logical partition switches to ESA/390 mode (switch to horizontal).

Algorithms of the Environment:

A topology must be assigned to a logical partition when it is first activated and then any changes in the nodal topology assigned to a logical partition must result in the logical partition being notified. The results of the nodal topology must be kept in a convenient new data structure to allow easier queries by the new STSI processing as well as limiting processing as best as possible when configuration changes are made. This new structure also allows for topology change processing completing in multiple steps with the required serialization for each step without introducing inconsistent views of the topology to the logical partition.

Topology Assignment

How the logical topology is chosen, is not important for this disclosure. Suffice it to say that a determination must be made of how many of each types of logical processors are needed and which nodes or books they need to be assigned to. For a vertical mode partition, this means the count of vertical high, vertical medium, and vertical low processors for each processor type.

Assigning Polarization Values to Logical CPs

Once the above counts are determined, the polarization assignments are made from lowest online logical CP address of the cp type to highest in the order of (1) all vertical highs, (2) all vertical mediums, and (3) all vertical lows. The order in which this is done is arbitrary and other orders of selection are possible.

'Store System Information' Instruction Mappings

Add 3 structures to map the 15.1.2 response:

1. Mapping for STSI 15.1.2, the Response Block Mapping the Topology

| Dcl | 1 | syibk1512 | char(4096) | based (*), |
|---|---|---|---|---|
| | 3 | * | char(2), | |
| | 3 | syibk1512_length | fixed(16), | length |
| | 3 | syibk1512_mag6 | fixed(8), | 6$^{th}$ level nest |
| | 3 | syibk1512_mag5 | fixed(8), | 5$^{th}$ |
| | 3 | syibk1512_mag4 | fixed(8), | 4$^{th}$ |
| | 3 | syibk1512_mag3 | fixed(8), | 3$^{rd}$ |
| | 3 | syibk1512_mag2 | fixed(8), | 2$^{nd}$, nodes |
| | 3 | syibk1512_mag1 | fixed(8), | 1$^{st}$, cpus |
| | 3 | * | char(1), | |
| | 3 | syibk1512_mnest | fixed(8), | nesting level |
| | 3 | * | char(4), | |
| | 3 | syibk1512_topology_list | char(0); | topology list |

2. Mapping for a Container-Type TLE for STSI 15.1.2

| Dcl | 1 | syibk_vcm_container | char(8) | based(*), |
|---|---|---|---|---|
| | 3 | syibknl | fixed(8), | nesting level |
| | 3 | * | char(3), | |
| | 3 | * | char(1), | |
| | 3 | * | char(2), | |
| | 3 | syibk_container_id | fixed(8); | node id |

3. Mapping for a CPU-Type TLE for STSI 15.1.2

| Dcl | 1 | syibk_vcm_cpu | char(16) | based(*), |
|---|---|---|---|---|
| | 3 | syibknl2 | fixed(8), | nesting level |
| | 3 | * | char(3), | |
| | 3 | syibk_ded_polarization | bit(8), | vcm byte |
| | 5 | * | bit(5), | |
| | 5 | syibk_dedicated | bit(1), | dedicated bit |
| | 5 | syibk_polarization | bit(2), | polarization bits |
| | 3 | syibk_cputype | fixed(8), | cpu type |
| | 3 | syibk_cpuaddrorg | fixed(16), | address origin |
| | 3 | syibk_cpumask | bit(64); | cpu mask entry |

TOPBK—Partition Topology

A summary of a logical partition's topology is kept current in this block by the nodal assignment routines. The data in this block is ordered in such a way that STSI processing can make one pass of the entire structure to create the logical partition topology response to the program, preserving the order and separation of CPU entries as required by architecture.

It consists of a 3 dimensional array (node, cp type, polarization classification) with a 64-bit CPU mask per entry.

A second working area, TOP_WORKING, is included for use in updating the topology.

```
DECLARE
  1 TOPBK BASED BDY(DWORD),
    3 TOP_CURRENT ,
      5 TOPCPUMASK(1:MAXNODE,  /* Each of 1-4 nodes      */
                   0:CPUTMAX,  /* CP type index          */
                   0:3)        /* 4 possible topology classifications when the
                                  logical partition is vertical. There are
                                  only 2 classifications when the partition is
                                  horizontal.                              */
        BIT(64),   /* Mask of the logical CPUs that fall into this
                      classification.                                      */
    3 TOP_WORKING CHAR(LENGTH(TOP_CURRENT));
                   /* Work area for building new topology    */
```

TO3PO—Partition Topology Translation

These "constant" translation tables are used by the nodal assignment routines which build the topology (mapped by TOPBK) and STSI processing which reads the topology.

```
/***************************  */
/* STSI translation arrays:    */
/***************************  */
DECLARE
  1 TOPVERT(0:3) BIT(8)  /* For vertical partitions, translates the
                            classification index above to the
```

```
                          architected D (dedication) and PP
                          (polarization) values to be returned for
                          this group of CPs in the STSI data        */
        STATIC INIT('00000'b||'1'b||PPVH,  /* Classification 0:
                                     Dedicated Vertical high        */
                   '00000'b||'0'b||PPVH,  /* Classification 1:
                                     Shared Vertical high           */
                   '00000'b||'0'b||PPVM,  /* Classification 2:
                                     Shared Vertical Medium         */
                   '00000'b||'0'b||PPVL),  /* Classification 3:
                                     Shared Vertical Low            */
  3 *      BIT(5),       /* Unused, need byte alignment for bit arrays*/
  3 TOPDPP BIT(3),       /* Actual D, PP values to use */
  1 TOPHOR(0:1) BIT(8)   /* For horizontal partitions, translates the
                           classification index above to the
                           architected D (dedication) and PP
                           (polarization) values to be returned for
                           this group of CPs in the STSI data. Note
                           only the first two classifications can be
                           used for a horizontal partition.           */
        STATIC INIT('00000'b||'1'b||PPH,   /* Classification 0:
                                     Dedicated Horizontal           */
                   '00000'b||'0'b||PPH),   /* Classification 1:
                                     Shared Horizontal              */
  3 * BIT(5),            /* Unused, need byte alignment for bit arrays*/
  3 TOPDPP BIT(3),       /* Actual D, PP values to use             */
/*********************** */
/* NDI translation array   */
/*********************** */
  1 TOPDPP2CLASS(0:7) FIXED /* Used by the nodal assignment routines to
                           create the topology information. LPDPP
                           is used as an index into this array to
                           determine which classification index the
                           logical CP should use. This one array is
                           used for both horizontal and vertical
                           partitions                              */
        STATIC INIT(1,    /* Shared, horizontal                    */
                   3,     /* Shared, vertical low                  */
                   2,     /* Shared, vertical medium               */
                   1,     /* Shared, vertical high                 */
                   0,     /* Dedicated, horizontal                 */
                   0,     /* Not applicable                        */
                   0,     /* Not applicable                        */
                   0),    /* Dedicated, vertical high              */
  3 *      CHAR(4);       /* Force to be non-simple item           */
```

Logical Processor Block:

A 2 bit encoding of partition polarization can be tracked for each logical processor to reflect its polarization. Grouping this with a 1-bit indication of dedication allows a complete polarity picture for a logical processor in 3-bits:

```
...
3 LPDPP BIT(3), /* Polarization, including dedication */
4 LPDED BIT(1), /* =1, logical CP is dedicated */
4 LPPP BIT(2), /* Processor Polarization */
...
/* Encodings for Processor Polarization */
PPH  BIT(2) CONSTANT('00'B), /* Horizontally polarized */
PPVL BIT(2) CONSTANT('01'B), /* Vertically polarized - Low */
PPVM BIT(2) CONSTANT('10'B), /* Vertically polarized - Medium */
PPVH BIT(2) CONSTANT('11'B), /* Vertically polarized - High */
Update Topology Block
Clear Local copy of CPU topology mask
DO for every logical CP in the target logical partition
IF the logical CP is online THEN
DO
Polarity index = Polarity index appropriate for the logical CPs polarization
value according to the translate polarization value to polarity index array
Local copy of CPU topology mask (cpu_address, node,cptype, Polarity
index) = ON
END
END
IF new topology block NOT= current topology block for partition THEN
Set topology change report bit and copy the new topology to the current.
```

Instruction Simulation for STSI 15.1.2

Within syibk mappings for the STSI 15.1.2 response block, a container-type TLE, and a CPU-type TLE have been added. Essentially, the data must be returned in container(s) with the entry at the lowest level being a CPU-type TLE. One can think of this as an array of arrays based on how the logical partition's resources have been subdivided or allocated. For the preferred embodiment, each container is essentially a node with a nesting level of 1 and includes CPU type TLE(S) that each has a nesting level of 0. The CPU TLEs are ordered by CPU type followed by their classification. Vertical partitions have four classifications (vertical dedicated, vertical high shared, vertical medium shared, & vertical low shared) and horizontal partitions have two classifications (dedicated & shared).

The following steps illustrate a use case for how a STSI 15.1.2 is handled after all the upfront checks have validated the instruction input.

For the current embodiment a max of 4 nodes and 64 processors is assumed.

Start scan of topbk, and in a local variable called current_node_value maintain the value of the node index we are currently on. The reason we need this is because if all the 64 bit masks within a node are zero, we do not need to create a container-type TLE for that node.

Once the first non-zero entry is found within a node, first create a container-type TLE entry for that node. Within the container TLE entry, the nesting value is 1, followed by 48 reserved bits. The last bits are the node ID which is the index in topbk of the current node we are processing. After creating the container-type TLE, create a CPU-type TLE for the entry with a non-zero bit mask. Within this entry, the nesting level is 0, followed by 24 reserved bits. The next 8 bits include the dedicated bit and the polarization bit. If the partition is currently vertical, fill in the polarization value and dedicated bit as follows:

Classification 0 in topbk is vertical dedicated, store a 11 in the PP and 1 in D Classification 1 in topbk is vertical high shared, store a 11 in PP and 0 in D Classification 2 in topbk is vertical medium shared, store 10 in PP and 0 in D Classification 3 in topbk is vertical low shared, store a 01 in PP and 0 in D For horizontal partitions, only classification 0 and 1 are currently valid. Fill in the dedicated bit and polarization value as follows:

Classification 0 in topbk is horizontal dedicated, store a 00 in the PP and 1 in D Classification 1 in topbk is horizontal shared, store a 00 in PP and 0 in D The CPU Type, the next value to be filled in the CPU-TLE is just the index of the second array within topcpumask in topbk. (0—GP, 2—IFA, 3—IFL, 4—ICF, 1 is currently unused).

The next value is the CPU address origin. This value is explicitly stored as 0 as the 64 is maximum number of CPUs available in the current embodiment.

The last value in syibk_vcm_cpu is the CPU mask, the non-zero 64 bit mask stored in the nested array of arrays topcpumask.

For each non-zero mask following the first non-zero bit mask within a node, create a separate CPU-type TLE entry and iterate through this process for all 4 nodes.

In an embodiment, the PTF instruction might request specific changes to the topology other than a change of polarization, such changes include (but are not limited to) requesting more guest processors be added to the guest configuration, requesting fewer guest processors in the guest configuration, requesting one or more dedicated processors be added or removed from the guest configuration, requesting specific polarization of specific guest processors, requesting co-processors be added or removed from the guest configuration, requesting a temporary change of the topology, requesting a change of the topology for a predetermined period of time and the like.

Furthermore, the invention is not limited to topology of processors. It can be appreciated that the basic component of the invention could advantageously apply to components other than CPUs, including, but not limited to co-processors, Caches, TLBs, internal data paths, data path buffers, distributed memory and I/O communications adapters for example.

What is claimed is:

1. A computer implemented method comprising:
executing, by a processor, a perform topology function instruction for requesting a configuration change of a topology of a plurality of processors (CPUs) of a configuration, the executing comprising:
any one of initiating a change of a polarization of the processors of the configuration according to a requested polarization change and rejecting the requested polarization change; and
setting a condition code, by the processor, to a value indicating whether a polarization change is initiated or rejected.

2. A method according to claim 1, wherein the processors are guest processors and the configuration is a guest configuration in a logically partitioned computer system.

3. A method according to claim 1, wherein the perform topology function instruction comprises an opcode field and a register field for requesting a polarization change.

4. A method according to claim 3, further comprising:
obtaining from a function code (FC) field of a register specified by the register field a function code, the function code comprising any one of a horizontal polarization specifier, a vertical polarization specifier, and a check of a topology change specifier;
based on the function code specifying a horizontal polarization, initiating horizontal polarization of the processors of the configuration;
based on the function code specifying a vertical polarization, initiating vertical polarization of the processors of the configuration; and
based on the function code specifying a check of a topology change, checking a completion status of the topology change.

5. A method according to claim 4, wherein horizontal polarization comprises providing substantially equal host processor resource to each processor resource, and wherein vertical polarization comprises providing substantially more host processor resource to at least one processor of said processors than to at least another processor of said processors.

6. A method according to claim 4, further comprising:
based on the requested polarization change being rejected, setting a reason code (RC) value in a register specified by said register field.

7. A method according to claim 6, wherein, based on the configuration being polarized as specified by the function code prior to execution, the RC value indicates that the configuration is already polarized according to the function code, and wherein, based on the configuration processing an incomplete polarization prior to execution, the RC value indicates that a topology change is already in process.

8. A method according to claim 1, wherein an initiated polarization change is asynchronous to completion of a previously executed perform topology function instruction.

9. A method according to claim 1, further comprising:
based on no topology change report being pending, setting a condition code indicating a topology change report not pending; and
based on a topology change report being pending, setting a condition code indicating a topology change report pending.

10. A computer system comprising:
a memory; and
one or more processors (CPUs) in communication with said memory, wherein the computer system is configured to perform a method, the method comprising:
executing, by a processor a perform topology function instruction for requesting a configuration change of a topology of a plurality of processors (CPUs) of a configuration, the executing comprising:
any one of initiating a change of a polarization of the processors of the configuration according to a requested polarization change and rejecting the requested polarization change; and setting a condition code, by the processor, to a value indicating whether a polarization change is initiated or rejected.

11. A computer system according to claim 10, wherein the processors are guest processors and the configuration is a guest configuration in a logically partitioned computer system.

12. A computer system according to claim 10, wherein the perform topology function instruction comprises an opcode field and a register field for requesting a polarization change.

13. A computer system according to claim 12, the method further comprising:
   obtaining from a function code (FC) field of a register specified by the register field a function code, the function code comprising any one of a horizontal polarization specifier, a vertical polarization specifier, and a check of a topology change specifier;
   based on the function code specifying a horizontal polarization, initiating horizontal polarization of the processors of the configuration;
   based on the function code specifying a vertical polarization, initiating vertical polarization of the processors of the configuration; and
   based on the function code specifying a check of a topology change, checking a completion status of the topology change.

14. A computer system claim 12, the method further comprising:
   based on the requested polarization change being rejected, setting a reason code (RC) value in a register specified by said register field.

15. A computer system according to claim 10, wherein an initiated polarization change is asynchronous to completion of a previously executed perform topology function instruction.

16. A computer program product, the computer program product comprising a tangible storage medium readable by a processing circuit and storing instructions for execution by the processing circuit for performing a method comprising:
   executing, by a processor, a perform topology function instruction for requesting a configuration change of a topology of a plurality of processors (CPUs) of a configuration, the executing comprising:
   any one of initiating a change of a polarization of the processors of the configuration according to a requested polarization change and rejecting the requested polarization change; and
   setting a condition code, by the processor, to a value indicating whether a polarization change is initiated or rejected.

17. A computer program product according to claim 16, wherein the perform topology function instruction comprises an opcode field and a register field for requesting a polarization change.

18. A computer program product according to claim 17, the method further comprising:
   obtaining from a function code (FC) field of a register specified by the register field a function code, the function code comprising any one of a horizontal polarization specifier, a vertical polarization specifier, and a check of a topology change specifier;
   based on the function code specifying a horizontal polarization, initiating horizontal polarization of the processors of the configuration;
   based on the function code specifying a vertical polarization, initiating vertical polarization of the processors of the configuration; and
   based on the function code specifying a check of a topology change, checking a completion status of the topology change.

19. A computer program product claim 17, further comprising:
   based on the requested polarization change being rejected, setting a reason code (RC) value in a register specified by said register field.

20. A computer program product according to claim 16, wherein an initiated polarization change is asynchronous to completion of a previously executed perform topology function instruction.

* * * * *